United States Patent
Ewald et al.

(10) Patent No.: US 8,841,373 B2
(45) Date of Patent: Sep. 23, 2014

(54) BOROPHOSPHATE, BORATE PHOSPHATE, AND METAL BOROPHOSPHATE AS NOVEL FLAME PROOFING ADDITIVES FOR PLASTICS

(75) Inventors: Bastian Ewald, Ludwigshafen (DE); Hartmut Hibst, Schriesheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/381,789

(22) PCT Filed: Jul. 1, 2010

(86) PCT No.: PCT/EP2010/059366
§ 371 (c)(1),
(2), (4) Date: Dec. 30, 2011

(87) PCT Pub. No.: WO2011/000913
PCT Pub. Date: Jan. 6, 2011

(65) Prior Publication Data
US 2012/0108713 A1    May 3, 2012

(30) Foreign Application Priority Data
Jul. 2, 2009   (EP) .................................... 09164369

(51) Int. Cl.
*C08K 3/38*      (2006.01)
*C09K 21/04*     (2006.01)

(52) U.S. Cl.
CPC ............. *C08K 3/38* (2013.01); *C08K 2201/014* (2013.01); *C09K 21/04* (2013.01)
USPC ........................................................ 524/405

(58) Field of Classification Search
USPC ................................. 524/405, 415
See application file for complete search history.

(56) References Cited

U.S. PATENT DOCUMENTS

| | | | | | |
|---|---|---|---|---|---|
| 3,899,810 A | * | 8/1975 | Stanley et al. | ................. | 28/166 |
| 5,554,674 A | * | 9/1996 | Hamilton | .................... | 524/288 |
| 5,693,700 A | * | 12/1997 | Venkataramani et al. | .... | 524/405 |
| 6,363,269 B1 | * | 3/2002 | Hanna et al. | .................. | 600/322 |
| 2009/0124743 A1 | * | 5/2009 | Lee | ............................... | 524/414 |
| 2010/0298474 A1 | * | 11/2010 | Futterer et al. | ................ | 524/100 |

FOREIGN PATENT DOCUMENTS

| | | |
|---|---|---|
| CA | 2185585 A1 | 9/1995 |
| CN | 1143657 A | 2/1997 |
| DE | 19525341 A1 | 1/1997 |
| DE | 102007035417 | * 7/2007 |
| EP | 0757072 A2 | 2/1997 |
| EP | 0757072 | * 5/1997 |
| WO | WO-9525066 A1 | 9/1995 |

OTHER PUBLICATIONS

Rüdiger Kniep et al., "Borophosphates—A Neglected Class of Compounds: Crystal Structures of $M^{II}[BPO_5]$ ($M^{II}$ = Ca, Sr) and $Ba_3[BP_3O_{12}]$", Agnew, Chem. Int. Ed. Engl., vol. 33, No. 7, pp. 749, (1994).
Bastian Ewald et al., "Structural Chemistry of Borophosphates, Metalloborophosphates, and Related Compounds", Z. Anorg. Allg. Chem., vol. 633, pp. 1517-1540, (2007).
International Preliminary Report on Patentability mailed Jan. 19, 2012.
International Search Report for PCT/EP2010/059366, mailed Dec. 13, 2010.
International Preliminary Report on Patentability for PCT/EP2010/059366, mailed Aug. 2, 2011.
Office Action from corresponding Chinese Application No. 201080038790.2 dated Mar. 25, 2013.

* cited by examiner

*Primary Examiner* — Peter Szekely
(74) *Attorney, Agent, or Firm* — Drinker Biddle & Reath LLP

(57) ABSTRACT

The present invention relates to a mixture comprising at least one plastic K and from 0.1 to 50% by weight, based on the entire mixture, of at least one compound A selected from the group consisting of borophosphates, borate phosphates, metalloborophosphates, and mixtures thereof, to a process for the production of said mixture, and to the use of said mixture as flame retardant.

10 Claims, No Drawings

BOROPHOSPHATE, BORATE PHOSPHATE, AND METAL BOROPHOSPHATE AS NOVEL FLAME PROOFING ADDITIVES FOR PLASTICS

CROSS-REFERENCE TO RELATED APPLICATIONS

This application is a national stage application (under 35 U.S.C. §371) of PCT/EP2010/059366, filed Jul. 1, 2010, which claims benefit of European application 09164369.2, filed Jul. 2, 2009.

The present invention relates to a mixture comprising at least one plastic K, preferably a thermoplastic or thermosetting plastic, and from 0.1 to 50% by weight, based on the entire mixture, of at least one compound A selected from the group consisting of borophosphates, borate phosphates, metalloborophosphates, and mixtures thereof, to a process for the production of said mixture via mixing of the at least one plastic K with at least one compound A, and to the use of this compound A as flame retardant in plastics.

The following definitions of the terms "borophosphates", "borate-phosphates" and "metalloborophosphates" is taken from the article *Structural Chemistry of Borophosphates, and Related Compounds*, B. Ewald, Y.-X. Huang and R. Kniep, Z. Anorg. Chem. 2007, 633, 1517 to 1540.

Borate-phosphates comprise isolated and/or condensed borate anions beside isolated and/or condensed phosphate anions. Furthermore, any further anions may be present, e.g. carbonate, sulfate, halogenide, hydroxide, silicate etc.

At least one borate- and one phosphate unit are condensed with each other in borophosphates, wherein further isolated and/or condensed borate anions and isolated and/or condensed phosphate anions may be present. Furthermore, any further anions may be present, e.g. carbonate, sulfate, halogenide, hydroxide, silicate etc.

If at least one borate unit, at least one phosphate unit and a metal complex anion having the coordination number 4 is present in the anionic part of the structure, this structure is called a metalloborophosphate, independent of the degree of condensation of the building units. Furthermore, any further anions may be present, e.g. carbonate, sulphate, halogenide, hydroxide, silicate, etc.

In addition, the oxo-/hydroxoligands (O, OH) of the borate, phosphate-metallate, borophosphate- and metalloborophosphate anions may be substituted, e.g. by halogens (F, Cl, Br, I) or organic groups like linear, branched or cyclic alkyl radicals or aromatic groups. Furthermore, any further anions may be present, e.g. carbonate, sulfate, halogenide, hydroxide, silicate etc.

Appropriate compounds comprising boron, and mixtures that comprise plastics and also comprise compounds comprising boron are known from the prior art. Appropriate compounds comprising phosphorus, e.g. ammonium polyphosphates (Clariant) and mixtures of these are also known.

DE 195 25 341 A1 discloses a process for the production of borophosphates, and the use of these as flame-retardant paints or impregnation systems for highly combustible substances, such as paper, wood, paperboard, textiles, etc. It is also disclosed that borophosphates, such as Ca borophosphates, can be incorporated into plastics for flame retardancy purposes. No plastics are disclosed in said specification, and no other compounds besides Ca borophosphates are disclosed, and no amounts of the individual components.

WO 95/25066 discloses crystalline borophosphates and their production and use, inter alia as catalysts or flame retardants in plastics. Particular compounds mentioned are potassium borophosphate, calcium borophosphate, $Na_2[B_7P_3O_{19}]$*$H_2O$, $Na_2[B_{3.9}P_{0.1}(OH)_3O_{5.2}]$*3 $H_2O$, luneburgite[$Mg_3B_2(OH)_6(PO_4)_2(H_2O)_6$], strontium borophosphate, nickel borophosphate, and $Ba_3[BP_3O_{12}]$. No amounts are stated for the use in plastics.

The article *Structural Chemistry of Borophosphates, and Related Compounds*, B. Ewald, Y.-X. Huang and R. Kniep, Z. Anorg. Chem. 2007, 633, 1517-1540 discloses numerous borophosphates, borate phosphates and metalloborophosphates. However, there is no disclosure that said compounds are suitable as flame retardants.

The article by R. Kniep, G. Gözel, B. Eisemann, C. Röhr, M. Asbrand and M Kizilyalli, Angew. Chem. Int. Ed. Engl. 1994, 33, No. 7, 749, likewise discloses various borophosphates of the formulae $M^{II}[BPO_5]$, where $M^{II}$=Ca or Sr and $Ba_3[P_3O_{12}]$, but there is not disclosure here that said compounds are suitable as flame retardants in plastics.

A SUMMARY OF THE INVENTION

It is an object of the present invention, in the light of the prior art, to provide flame-retardant plastics, for example thermoplastics or thermosetting plastics, which do not have the disadvantages of the known plastics, for example impaired mechanical properties or the need to admix at least two compounds or more together as additives. Another object of the present invention is to provide flame-retardant plastics which have only a low number of flame retardant, preferably in low amounts, and which do not require, as is known from the prior art, a plurality of additives. A further intention is that the mixtures of the invention combine a plurality of flame-retardant properties in one compound, where these otherwise would have to be achieved via addition of two individual compounds, the aim being thus to reduce the total content of additives, thus by way of example achieving better mechanical properties.

Furthermore, some flame retardants of the prior art are limited in their application due to high process temperatures of thermoplastics, i.e. they decompose already at temperatures in the range of the process temperatures. Process temperatures for PBT and PA may be up to 200 to 217 and 250 to 320° C. respectively. Known flame retardants like $Al(OH)_3$ significantly decompose in this range (release of water).

Said objects are achieved via the mixture of the invention, comprising at least one plastic K and from 0.1 to 50% by weight, based on the entire mixture, of at least one compound A selected from the group consisting of borophosphates, borate phosphates, metalloborophosphates, and mixtures thereof.

In a preferred embodiment, at least one thermoplastic or thermosetting plastic is used as plastic.

Thermoplastic or Thermosetting Plastic K

In principle, the advantageous effect is apparent with plastics, preferably thermoplastic or thermosetting plastics, of any type. A list of suitable thermoplastics is found by way of example in Kunststoff-Taschenbuch [Plastics handbook] (ed. Saechtling), 1989 edition, which also mentions sources. Processes for the production of such thermoplastics are known per se to a person skilled in the art.

In one preferred embodiment of the mixture according to the invention, the at least one plastic K has been selected from the group consisting of polyoxymethylene homo- or copolymers, polycarbonates, polyesters, polyolefins, poly(meth)acrylates, polyamides, vinylaromatic polymers, polyarylene ethers, epoxy-resins and mixtures thereof. These preferred thermoplastic or thermosetting plastics are explained below.

Polyoxymethylene Homo- or Copolymers

These polymers are known per se to the person skilled in the art and are described in the literature.

Very generally, these polymers have at least 50 mol % of —$CH_2O$— repeat units in the main polymer chain. The homopolymers are generally produced by polymerization of formaldehyde or trioxane, preferably in the presence of suitable catalysts.

Preference is given to polyoxymethylene copolymers, which also comprise, alongside the —$CH_2O$— repeat units, up to 50 mol %, preferably from 0.1 to 20 mol %, in particular from 0.3 to 10 mol %, and very particularly preferably from 2 to 6 mol %, of

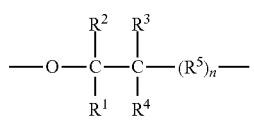

repeat units, where $R^1$ to $R^4$, independently of each other, are a hydrogen atom, a $C_1$-$C_4$-alkyl group, or a halogen-substituted alkyl group having from 1 to 4 carbon atoms, and $R^5$ is a —$CH_2$— group or —$CH_2O$— group, or is a $C_1$-$C_4$-alkyl- or $C_1$-$C_4$-haloalkyl-substituted methylene group or a corresponding oxymethylene group, and the value of n is in the range from 0 to 3. These groups can advantageously be introduced into the copolymers via ring opening of cyclic ethers. Preferred cyclic ethers are those of the formula

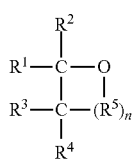

where $R^1$ to $R^5$ and n are as defined above. Merely by way of example, mention may be made of ethylene oxide, propylene 1,2-oxide, butylene 1,2-oxide, butylene 1,3-oxide, 1,3-dioxane, 1,3-dioxolane, and 1,3-dioxepan as cyclic ethers, and also of linear oligo- or polyformals, such as polydioxolane or polydioxepan, as comonomers.

Other suitable plastics K are oxymethylene terpolymers which, by way of example, are prepared via reaction of trioxane and of one of the cyclic ethers described above with a third monomer, preferably bifunctional compounds of the formula

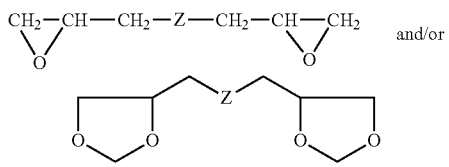

where Z is a chemical bond, —O—, —ORO— (R=$C_1$-$C_8$-alkylene or $C_3$-$C_8$-cycloalkylene).

Preferred monomers of this type are ethylene diglycide, diglycidyl ether, and diethers composed of glycidyl compounds and formaldehyde, dioxane or trioxane in a molar ratio of 2:1, and also diethers composed of 2 mol of glycidyl compound and 1 mol of an aliphatic diol having from 2 to 8 carbon atoms, e.g. diglycidyl ethers of ethylene glycol, 1,4-butanediol, 1,3-butanediol, 1,3-cyclobutanediol, 1,2-propanediol, and 1,4-cyclohexanediol, to mention just a few examples.

Processes for the production of the homo- and copolymers described above are known to the person skilled in the art and are described in the literature.

The preferred polyoxymethylene copolymers have melting points of at least 150° C. and molar masses (weight average) Mw in the range from 5000 to 200 000, preferably from 7000 to 150 000 g/mol.

Particular preference is given to end-group-stabilized polyoxymethylene polymers, which have carbon-carbon bonds at the ends of the chains.

Polycarbonates and Polyesters

Suitable polycarbonates are known per se. They are obtainable by way of example by the processes of DE-B-1 300 266 via interfacial polycondensation or by the process of DE-A-14 95 730 via reaction of biphenyl carbonate with bisphenols. Preferred bisphenol is 2,2-di(4-hydroxyphenyl)propane, generally—and hereinafter—termed bisphenol A.

In place of bisphenol A, other aromatic dihydroxy compounds can also be used, in particular 2,2-di(4-hydroxyphenyl)pentane, 2,6-dihydroxynaphthalene, 4,4'-dihydroxydiphenyl sulfone, 4,4'-dihydroxydiphenyl ether, 4,4'-dihydroxydiphenyl sulfite, 4,4'-dihydroxydiphenylmethane, 1,1-di(4-hydroxyphenyl)ethane or 4,4-dihydroxy-diphenyl, and mixtures of the abovementioned dihydroxy compounds. Particularly preferred polycarbonates are those based on bisphenol A or bisphenol A together with up to 30 mol % of the abovementioned aromatic dihydroxy compounds.

The relative viscosity of these polycarbonates is generally in the range from 1.1 to 1.5, in particular from 1.28 to 1.4 (measured at 23° C. in a 0.5% strength by weight solution in dichloromethane).

Suitable polyesters are likewise known per se and described in the literature. They comprise, in the main chain, an aromatic ring which derives from an aromatic dicarboxylic acid. The aromatic ring can also have substitution, e.g. with halogen, such as chlorine and bromine, or with $C_1$-$C_4$-alkyl groups, such as methyl, ethyl, isopropyl, n-propyl, n-butyl, isobutyl or tert-butyl groups.

The polyesters may be prepared by reaction of aromatic dicarboxylic acids, their esters or other ester-forming derivatives thereof with aliphatic dihydroxy compounds, in a manner known per se.

These polyalkylene terephthalates are known per se and are described in the literature. Their main chain comprises an aromatic ring which derives from the aromatic dicarboxylic acid. The aromatic ring can also have substitution, e.g. with halogen, such as chlorine and bromine, or with $C_1$-$C_4$-alkyl groups, such as methyl, ethyl, isopropyl, n-propyl, n-butyl, isobutyl or tert-butyl groups.

These polyalkylene terephthalates may be prepared by reaction of aromatic dicarboxylic acids, their esters, or other ester-forming derivatives with aliphatic dihydroxy compounds, in a manner known per se.

Preferred dicarboxylic acids are naphthalene-2,6-dicarboxylic acid, terephthalic acid and isophthalic acid or mixtures of these. Up to 30 mol %, preferably not more than 10 mol %, of the aromatic dicarboxylic acids can be replaced by aliphatic or cycloaliphatic dicarboxylic acids, such as adipic acid, azelaic acid, sebacic acid, dodecanedioic acids and cyclohexanedicarboxylic acids.

Of the aliphatic dihydroxy compounds, preference is given to diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol or mixtures of these.

Particularly preferred polyesters (A) are polyalkylene terephthalates derived from alkanediols having from 2 to 6 carbon atoms. Among these, particular preference is given to polyethylene terephthalate, polypropylene terephthalate and polybutylene terephthalate and to mixtures of these, and it is also possible here to use up to 50% by weight, based on A), of polyethylene terephthalate in the form of recyclate.

The intrinsic viscosity of the polyesters (A) is generally in the range from 60 to 220, preferably from 100 to 150 measured in a 0.5% strength by weight solution in a mixture of phenol and o-dichlorobenzene (weight ratio 1:1) at 25° C.

Particularly preferred polyesters are those whose carboxy end group content is up to 100 mmol/kg, preferably up to 50 mmol/kg and in particular up to 40 mmol/kg of polyester. These polyesters can by way of example be prepared by the process of DE-A 44 01 055. The carboxy end group content is usually determined via titration methods (e.g. potentiometry).

Another group which may be mentioned is that of fully aromatic polyesters which derive from aromatic dicarboxylic acids and from aromatic dihydroxy compounds.

Suitable aromatic dicarboxylic acids are the compounds already described for the polyalkylene terephthalates. The mixtures preferably used are composed of from 5 to 100 mol % of isophthalic acid and from 0 to 95 mol % of terephthalic acid, in particular mixtures of from about 50 to about 80% of terephthalic acid and from 20 to about 50% of isophthalic acid.

The aromatic dihydroxy compounds preferably have the general formula

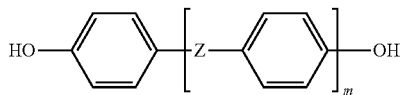

where Z is an alkylene or cycloalkylene group having up to 8 carbon atoms, an arylene group having up to 12 carbon atoms, a carbonyl group, a sulfonyl group, an oxygen or sulfur atom, or a chemical bond, and m is from 0 to 2. The phenylene groups of the dihydroxy compounds may also have substitution by $C_1$-$C_6$-alkyl or -alkoxy groups and fluorine, chlorine or bromine.

Examples of parent compounds are dihydroxydiphenyl, di(hydroxyphenyl)alkane, di(hydroxyphenyl)cycloalkane, di(hydroxyphenyl) sulfide, di(hydroxyphenyl)ether, di(hydroxyphenyl) ketone, di(hydroxyphenyl) sulfoxide, α,α'-di(hydroxy-phenyl)dialkylbenzene, di(hydroxyphenyl) sulfone, di(hydroxybenzoyl)benzene, resorcinol and hydroquinone, and also the ring-alkylated and ring-halogenated derivatives of these.

Among these, preference is given to 4,4'-dihydroxydiphenyl, 2,4-di(4'-hydroxyphenyl)-2-methylbutane, α,α'-di(4-hydroxyphenyl)-p-diisopropylbenzene, 2,2-di(3'-methyl-4'-hydroxyphenyl)propane, and 2,2-di(3'-chloro-4'-hydroxyphenyl)propane, and in particular to 2,2-di(4'-hydroxyphenyl)propane, 2,2-di(3',5'-dichlorodihydroxyphenyl)propane, 1,1-di(4'-hydroxyphenyl)cyclohexane, 3,4'-dihydroxybenzophenone, 4,4'-dihydroxydiphenyl sulfone and 2,2-di(3',5'-dimethyl-4'-hydroxyphenyl)propane and mixtures thereof.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyetheresters. Products of this type are known per se and are described in the literature, e.g. in U.S. Pat. No. 3,651,014. Corresponding products are also available commercially, e.g. Hytrel® (DuPont).

Preferred dicarboxylic acids that may be mentioned are naphthalenedicarboxylic acid, terephthalic acid, and isophthalic acid, and mixtures of these. Up to 10 mol % of the aromatic dicarboxylic acids can be replaced by aliphatic or cycloaliphatic dicarboxylic acids, such as adipic acid, azelaic acid, sebacic acid, dodecanedioic acids, and cyclohexanedicarboxylic acids. Among the aliphatic dihydroxy compounds, preference is given to diols having from 2 to 6 carbon atoms, in particular 1,2-ethanediol, 1,4-butanediol, 1,6-hexanediol, 1,4-hexanediol, 1,4-cyclohexanediol, and neopentyl glycol, and mixtures of these.

Particularly preferred polyesters that may be mentioned are polyalkylene terephthalates which derive from alkanediols having from 2 to 6 carbon atoms. Among these, particular preference is given to polyethylene terephthalate, polyethylene naphthalate, and polybutylene terephthalate.

The intrinsic viscosity of the polyesters is generally in the range from 60 to 200 ml/g, measured in 0.5% strength by weight solution in a phenol/o-dichlorobenzene mixture (ratio by weight 1:1) at 23° C.

Polyolefins

Mention may be made here very generally of polyethylene and polypropylene, and also of copolymers based on ethylene or propylene, and also if appropriate those with higher alpha-olefins. Corresponding products are obtainable as Lupolen® or Hostalen®/Moplen® from BASELL.

In a preferred embodiment, at least one copolymer is used as polyolefin, composed of ethylene and vinylacrylate. These are used, for example, as cable coating. These copolymers are known to the skilled artisan.

Poly(meth)acrylates

Among these, particular mention is made of polymethyl methacrylate (PMMA), and also of copolymers based on methyl methacrylate with up to 40% by weight of further copolymerizable monomers, for example the materials obtainable as Plexiglas®.

Polyamides

Suitable polyamides generally have an intrinsic viscosity of from 70 to 350 ml/g, preferably from 110 to 240 ml/g, determined in a 0.5% strength by weight solution in 96% strength by weight sulfuric acid at 25° C., according to ISO 307.

Preference is given to semicrystalline or amorphous resins with a molecular weight (Mw) of at least 5000, as described, for example, in U.S. Pat. Nos. 2,071,250, 2,071,251, 2,130,523, 2,130,948, 2,241,322, 2,312,966, 2,512,606 and 3,393,210.

Examples of these are polyamides derived from lactams having from 7 to 13 ring members, such as polycaprolactam, polycapryllactam and polylaurolactam, and polyamides obtained by reacting dicarboxylic acids with diamines. Dicarboxylic acids which may be employed are alkanedicarboxylic acids having from 6 to 12, in particular from 6 to 10, carbon atoms and aromatic dicarboxylic acids. Just a few of the acids that may be mentioned here are, adipic acid, azelaic acid, sebacic acid, dodecanedioic acid and terephthalic and/or isophthalic acid.

Particularly suitable diamines are alkanediamines having from 4 to 12, in particular from 6 to 8, carbon atoms, and m-xylylenediamine, di(4-aminophenyl)methane, di(4-aminocyclohexyl)methane, 2,2-di(4-aminophenyl)propane, 2,2-di(4-aminocyclohexyl)propane, or 3,3'-dimethyl-4,4'-diaminodicyclohexylmethane, or 4,4'-diaminodicyclohexylmethane.

Preferred polyamides are polyhexamethylene adipamide, polyhexamethylene sebacamide, polycaprolactam and the nylon-6/6,6 copolyamides, especially with a proportion of from 5 to 95% by weight of caprolactam units.

Examples of other polyamides are those obtainable, for example, by condensing 1,4-diaminobutane with adipic acid at elevated temperature (nylon-4,6). Preparation processes for polyamides of this structure are described, for example, in EP-A 38 094, EP-A 38 582 and EP-A 39 524.

Polyamides which are obtainable by copolymerizing two or more of the abovementioned monomers, and mixtures of a number of polyamides in any desired mixing ratio, are also suitable.

Furthermore, semi-aromatic copolyamides such as PA 6/6T and PA 66/6T have proven particularly advantageous when their triamine content is less than 0.5% by weight, preferably less than 0.3% by weight (see EP-A 299 444).

Further suitable polyamides are selected from the group consisting of polyamide-9, for example prepared from 9-amino-nonane carboxylic acid, polyamide-10, for example prepared from 10-amino-decane carboxylic acid, PA 6/9, for example prepared from hexamethylene diamine/azelaic acid, PA 6/12, for example prepared from hexamethylene diamine/dodecane diacid, PA 11, for example prepared from 11-aminoundecane acid, PA 12, for example prepared from laurine lactame or omega-aminododecane acid, PA 4/6, for example prepared from tetramethylene diamine/adipic acid, PA 12/12, for example prepared from dodecane diamine/dodecane diacid, PA 6/12, for example prepared from caprolactame/laurine lactame, and mixtures thereof. These polyamides are known to the skilled artisan.

The preferred semi-aromatic copolyamides with low triamine content can be prepared in accordance with the processes described in EP-A 129 195 and 129 196.

It is, of course, also possible to use mixtures (blends) of these polymers.

Vinylaromatic Polymers

The weight-average molar mass Mw of these polymers, which are known per se and are available commercially, is generally in the range from 1500 to 2 000 000 g/mol, preferably in the range from 70 000 to 1 000 000 g/mol.

Vinylaromatic polymers which may be mentioned merely as examples here are those made from styrene, chlorostyrene, α-methylstyrene and p-methylstyrene; comonomers, such as (meth)acrylonitrile or (meth)acrylates, may also be involved in the construction in subordinate proportions (preferably not more than 50% by weight, in particular not more than 35% by weight). Particularly preferred vinylaromatic polymers are polystyrene and impact-modified polystyrene. Mixtures of these may, of course, also be employed. They are preferably prepared by the process described in EP-A-302 485.

Preferred ASA polymers are built up from a soft or rubber phase composed of a graft polymer of:
$A_1$ from 50 to 90% by weight of a graft base, based on
$A_{11}$ from 95 to 99.9% by weight of a $C_2$-$C_{10}$-alkyl acrylate and
$A_{12}$ from 0.1 to 5% by weight of a bifunctional monomer having two non-conjugated olefinic double bonds, and
$A_2$ from 10 to 50% by weight of a graft composed of
$A_{21}$ from 20 to 90% by weight of styrene or substituted styrenes of the general formula I or a mixture of these, and
$A_{22}$ from 10 to 80% by weight of acrylonitrile, methacrylonitrile, acrylates or methacrylates or a mixture of these, mixed with a hard matrix based on a SAN copolymer $A_3$) of:
$A_{31}$ from 50 to 90% by weight, preferably from 55 to 90% by weight, and in particular from 65 to 85% by weight, of styrene and/or substituted styrenes of the general formula I and
$A_{32}$ from 10 to 50% by weight, preferably from 10 to 45% by weight, and in particular from 15 to 35% by weight, of acrylonitrile and/or methacrylonitrile.

Component $A_1$) is an elastomer whose glass transition temperature is below −20° C., in particular below −30° C.

For preparing the elastomer, the main monomers $A_{11}$) employed are acrylates having from 2 to 10 carbon atoms, in particular from 4 to 8 carbon atoms. Examples of particularly preferred monomers are here tert-butyl, isobutyl and n-butyl acrylate and 2-ethylhexyl acrylate, of which the two last named are particularly preferred. Besides these acrylates, from 0.1 to 5% by weight, in particular from 1 to 4% by weight, based on the total weight $A_{11}$+$A_{12}$, of a polyfunctional monomer having at least two non-conjugated olefinic double bonds is employed. Of these compounds, preference is given to bifunctional compounds, i.e. having two non-conjugated double bonds. Examples are divinylbenzene, diallyl fumarate, diallyl phthalate, triallyl cyanurate, triallyl isocyanurate, tricyclodecenyl acrylate and dihydrodicyclopentadienyl acrylate, of which the two last named are particularly preferred.

Processes for preparing the graft base $A_1$ are known per se and are described, for example, in DE-B 1 260 135. Corresponding products are also commercially available. Preparation by emulsion polymerization has proven particularly advantageous in some cases. The precise conditions of polymerization, in particular the type, method of feeding, and amount of emulsifier are preferably selected so that the acrylate latex, which is at least partially crosslinked, has a mean particle size (weight average) in the range from about 200 to 700 nm, in particular from 250 to 600 nm. The latex preferably has a narrow particle size distribution, i.e. the quotient $$Q = \frac{d_{90} - d_{10}}{d_{50}}$$

is preferably smaller than 0.5, in particular smaller than 0.35.

The proportion of the graft base $A_1$ in the graft polymer $A_1$+$A_2$ is from 50 to 90% by weight, preferably from 55 to 85% by weight, and in particular from 60 to 80% by weight, based on the total weight of $A_1$+$A_2$.

A graft shell $A_2$ is grafted onto the graft base $A_1$, the graft shell $A_2$ being obtainable by copolymerization of
$A_{21}$ from 20 to 90% by weight, preferably from 30 to 90% by weight, and in particular from 30 to 80% by weight, of styrene or substituted styrenes of the general formula

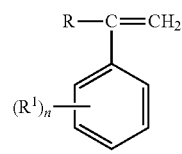

where R is alkyl radicals having from 1 to 8 carbon atoms, hydrogen atoms, or halogen atoms, and $R^1$ is alkyl radicals having from 1 to 8 carbon atoms, hydrogen atoms, or halogen atoms, and the value of n is 0, 1, 2, or 3, and $A_{22}$ from 10 to 80% by weight, preferably from 10 to 70% by weight, and in particular from 20 to 70% by weight, of acrylonitrile, methacrylonitrile, acrylates or methacrylates or a mixture of these.

Examples of substituted styrenes are α-methylstyrene, p-methylstyrene, p-chlorostyrene and p-chloro-α-methylstyrene, and of these styrene and α-methylstyrene are preferred.

Preferred acrylates and/or methacrylates are those whose homopolymers and/or copolymers with the other monomers of component $A_{22}$) have glass transition temperatures above 20° C.; in principle, however, other acrylates may also be employed, preferably in amounts which result in an overall glass transition temperature $T_g$ of above 20° C. for the component $A_2$.

Particular preference is given to esters formed from acrylic or methacrylic acid with $C_1$-$C_8$ alcohols and esters comprising epoxy groups, such as glycidyl acrylate and/or glycidyl methacrylate. Examples of very particularly preferred compounds are methyl methacrylate, tert-butyl methacrylate, glycidyl methacrylate and n-butyl acrylate, where the last named is preferably not employed in an excessively high proportion, because of its property of forming polymers with very low $T_g$.

The graft shell $A_2$ can be prepared in one step of a process or in a plurality of these, e.g. two or three, the overall formulation remaining unaffected thereby.

The graft shell is preferably prepared in emulsion, as described, for example, in DE Patent 12 60 135, DE-A-32 27 555, DE-A-31 49 357 and DE-A-34 14 118.

Depending on the selected conditions, the graft copolymerization gives rise to a certain proportion of free copolymers of styrene and/or substituted styrene derivatives and (meth)acrylonitrile and/or (meth)acrylates.

The graft copolymer $A_1+A_2$ generally has a mean particle size of from 100 to 1000 nm, in particular from 200 to 700 nm, ($d_{50}$ weight average). The conditions for preparing the elastomer $A_1$) and for the grafting are preferably therefore selected so as to give particle sizes in this range. Measures for this are known and are described, for example, in DE Patent 1 260 135 and in DE-A-28 26 925, and in Journal of Applied Polymer Science, Vol. 9 (1965), pp. 2929 to 2938. The increase in particle size of the elastomer latex can be brought about, for example, by agglomeration.

For the purposes of this invention, the free, non-grafted homo- and copolymers arising during the graft copolymerization to prepare the component $A_2$) are counted as part of the graft polymer ($A_1+A_2$).

Some preferred graft polymers are listed below:
1: 60% by weight of graft base $A_1$ made from
   $A_{11}$ 98% by weight of n-butyl acrylate and
   $A_{12}$ 2% by weight of dihydrodicyclopentadienyl acrylate and 40% by weight of graft shell $A_2$ made from
   $A_{21}$ 75% by weight of styrene and
   $A_{22}$ 25% by weight of acrylonitrile
2: Graft base as in 1, with 5% by weight of a first graft shell of styrene and
   35% by weight of a second graft made from
   $A_{21}$ 75% by weight of styrene and
   $A_{22}$ 25% by weight of acrylonitrile
3: Graft base as in 1, with 13% by weight of a first graft of styrene and 27% by weight of a second graft made from styrene and acrylonitrile in a weight ratio of 3:1

The products present as component $A_3$) can be prepared, for example, by the process described in DE-B-10 01 001 and DE-B-10 03 436. Such copolymers are also available commercially. The weight-average molar mass, determined by light scattering, is preferably in the range from 50 000 to 500 000, in particular from 100 000 to 250 000 g/mol.

The ratio by weight of $(A_1+A_2):A_3$ is in the range from 1:2.5 to 2.5:1, preferably from 1:2 to 2:1 and in particular from 1:1.5 to 1.5:1.

SAN polymers suitable as component A) are described above (see $A_{31}$ and $A_{32}$).

The intrinsic viscosity of the SAN polymers measured according to DIN 53 727 as 0.5% strength by weight solution in dimethylformamide at 23° C. is generally in the range from 40 to 100 ml/g, preferably from 50 to 80 ml/g. ABS polymers present as polymer (A) in the inventive multiphase polymer mixtures have the same construction as described above for ASA polymers. In place of the acrylate rubber $A_1$) of the graft base of the ASA polymer, conjugated dienes are usually employed, preferably giving the following formulation for the graft base $A_4$:
$A_{41}$ from 70 to 100% by weight of a conjugated diene and
$A_{42}$ from 0 to 30% by weight of a bifunctional monomer having two non-conjugated olefinic double bonds or a vinylaromatic compound or a mixture of the two.

In the formulation, the graft $A_2$ and the hard matrix of the SAN copolymer $A_3$) remain unchanged. Such products are commercially available, and the preparation processes are known to the person skilled in the art.

The ratio by weight of $(A_4+A_2):A_3$ is in the range from 3:1 to 1:3, preferably from 2:1 to 1:2.

Particularly preferred formulations of the thermoplastic molding compositions contain, as component A), a mixture of:
$A_1$) from 10 to 90% by weight of a polybutylene terephthalate
$A_2$) from 0 to 40% by weight of a polyethylene terephthalate
$A_3$) from 1 to 40% by weight of an ASA or ABS polymer or mixtures of these.

Products of this type are available from BASF SE under the trademark Ultradur® S.

Other preferred formulations of component A) comprise
$A_1$) from 10 to 90% by weight of a polycarbonate
$A_2$) from 0 to 40% by weight of a polyester, preferably polybutylene terephthalate,
$A_3$) from 1 to 40% by weight of an ASA or ABS polymer or mixtures of these.

Products of this type are obtainable in the form of Terblend® from BASF SE.

A further preferred vinylaromatic polymer according to the present invention is a copolymer, composed of the different monomers acrylic nitrile, 1,3-butadiene and styrene. This acrylic nitrile-butadiene-styrene-copolymer (ABS-copolymer) is known to the skilled artisan. The ratios of amounts may vary from 15 to 35% by weight acrylic nitrile, 5 to 30% by weight butadiene and 40 to 60% by weight styrene.

Polyarylene Ethers

Polyarylene ethers A) are preferably either polyarylene ethers per se, polyarylene ether sulfides, polyarylene ether sulfones, or polyarylene ether ketones. The arylene groups of these can be identical or different and, independently of one another, are an aromatic radical having from 6 to 18 carbon atoms. Examples of suitable arylene radicals are phenylene, bisphenylene, terphenylene, 1,5-naphthylene, 1,6-naphthylene, 1,5-anthrylene, 9,10-anthrylene, or 2,6-anthrylene. Among these, preference is given to 1,4-phenylene and 4,4'-biphenylene. These aromatic radicals are preferably unsubstituted radicals. However, they can bear one or more substituents. Examples of suitable substituents are alkyl, arylalkyl, aryl, nitro, cyano, or alkoxy groups, and also heteroaromatics, such as pyridine, and halogen atoms. Among the preferred substituents are alkyl radicals having up to 10 carbon atoms, e.g. methyl, ethyl, isopropyl, n-hexyl, isohexyl, $C_1$-$C_{10}$-alkoxy radicals, such as methoxy, ethoxy, n-propoxy, n-butoxy, aryl radicals having up to 20 carbon atoms, e.g. phenyl or naphthyl, and also fluorine and chlorine. These can have linkage to one another not only by way of —O— but also by way of —S—, —SO—, —SO$_2$—, —CO—, —N=N—, —COO—, an alkylene radical, or a chemical bond. The arylene groups in the polyarylene ethers (B) can also have linkage to one another by way of different groups.

Among the preferred polyarylene ethers are those having repeat units of the general formula I

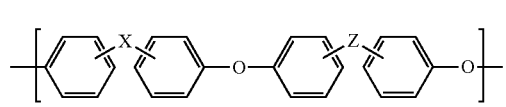   (I)

It is also possible to use their ring-substituted derivatives. Preferred substituents that can be used are $C_1$-$C_6$-alkyl, such as methyl, ethyl, or tert-butyl, $C_1$-$C_6$-alkoxy, such as methoxy or ethoxy, aryl, in particular phenyl, chlorine or fluorine. The variable X can be —SO$_2$—, —SO—, —S—, —O—, CO, —N=N—, —RC=CR$^a$—, —CR$^b$R$^c$—, or a chemical bond. The variable Z can be —SO$_2$—, —SO—, —CO—, —O—, —N=N—, or —RC=CR$^a$. Each of R and R$^a$ here is hydrogen, $C_1$-$C_6$-alkyl, e.g. methyl, n-propyl or n-hexyl, $C_1$-$C_6$-alkoxy, including methoxy, ethoxy or butoxy, or aryl, in particular phenyl. Each of the radicals R$^b$ and R$^c$ can be hydrogen or a $C_1$-$C_6$-alkyl group, in particular methyl. However, they can also have linkage to one another to form a $C_4$-$C_{10}$-cycloalkyl ring, preferably a cyclopentyl or cyclohexyl ring, which in its turn can have substitution by one or more alkyl groups, preferably methyl. Alongside this, R$^b$ and R$^c$ can also be a $C_1$-$C_6$-alkoxy group, e.g. methoxy or ethoxy, or an aryl group, particularly phenyl. Each of the abovementioned groups can in turn have substitution by chlorine or fluorine.

Some of the preferred repeat units I are listed below:

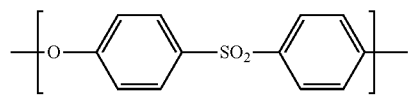   (I1)

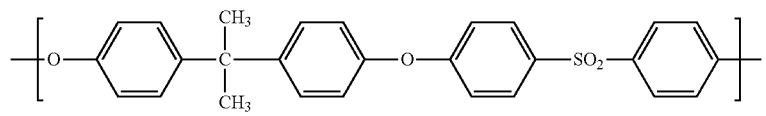   (I2)

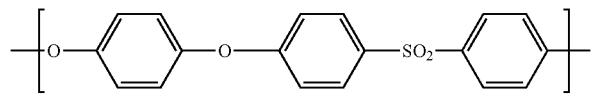   (I3)

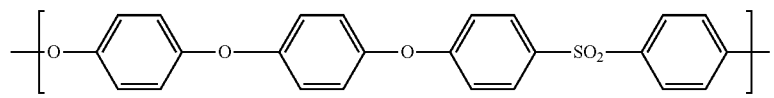   (I4)

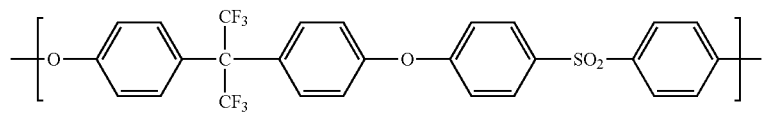   (I5)

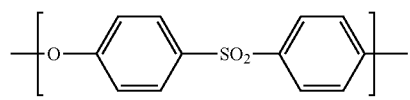   (I1)

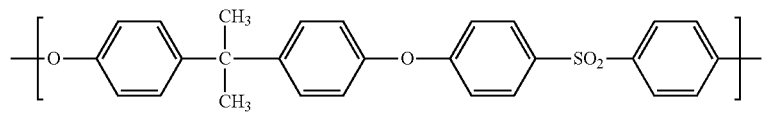   (I2)

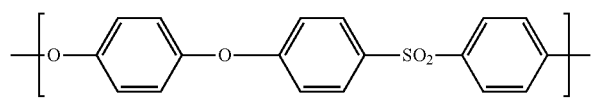   (I3)

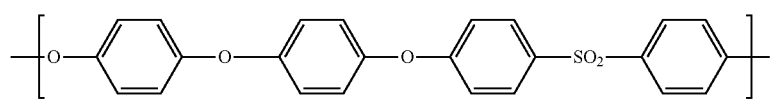   (I4)

-continued
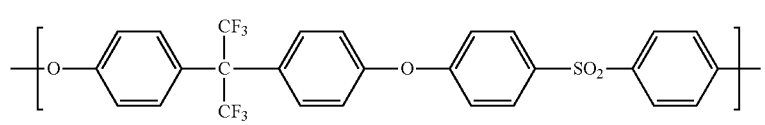   (I5)
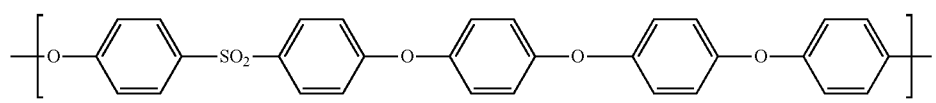   (I6)
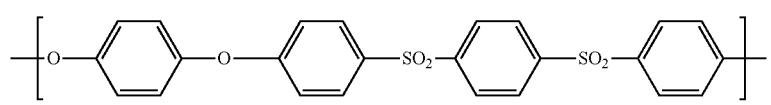   (I7)
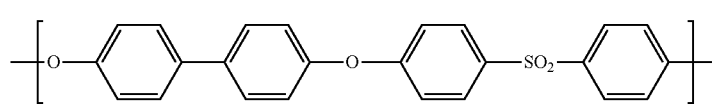   (I8)
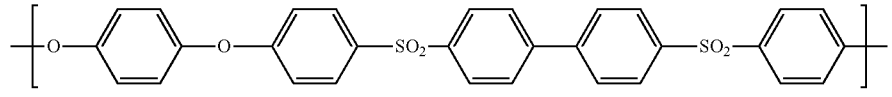   (I9)
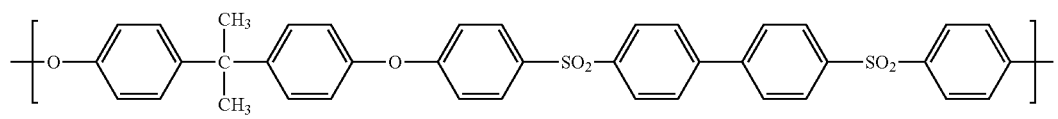   (I10)
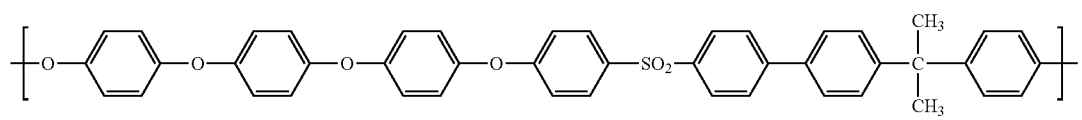   (I11)
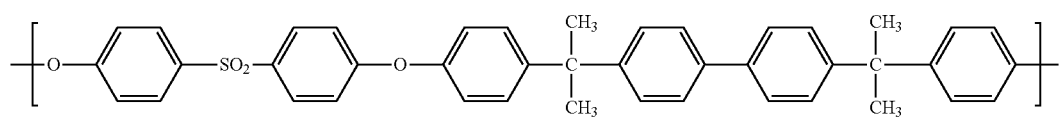   (I12)
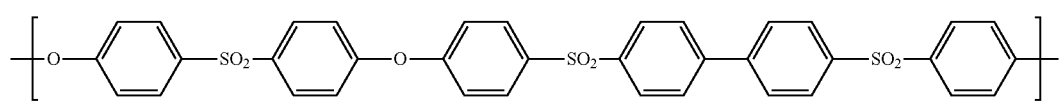   (I13)
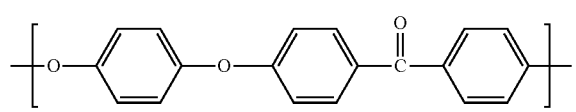   (I14)
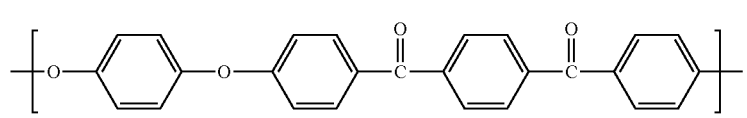   (I15)
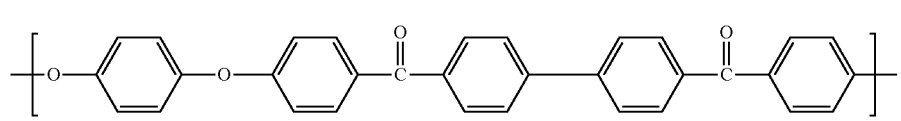   (I16)
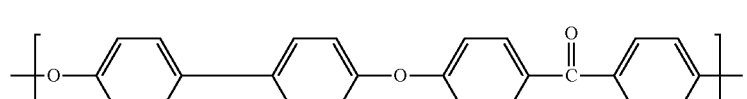   (I17)
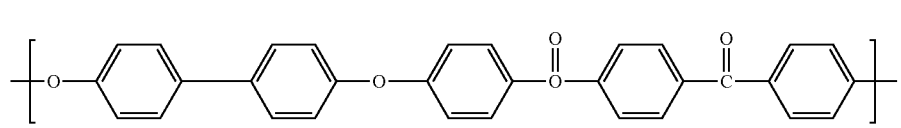   (I18)

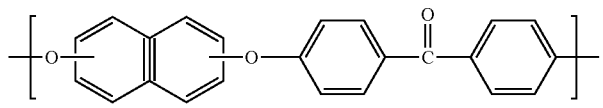

(I19)

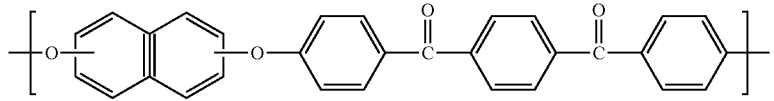

(I20)

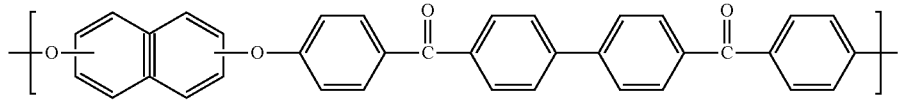

(I21)

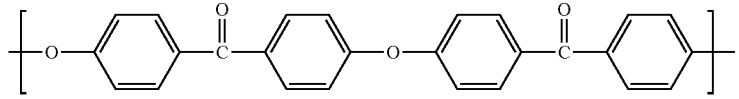

(I22)

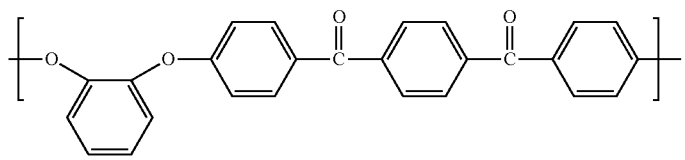

(I23)

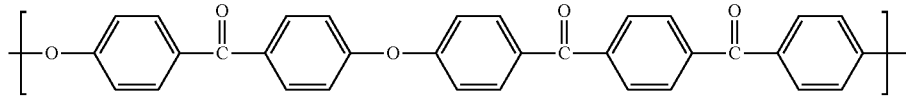

(I24)

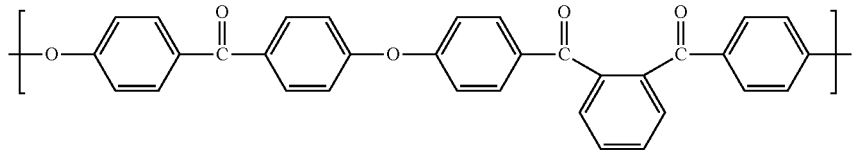

(I25)

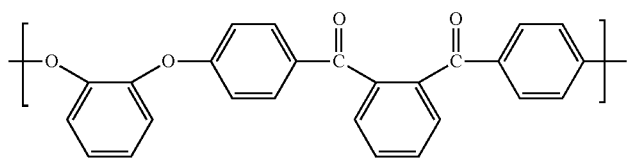

(I26)

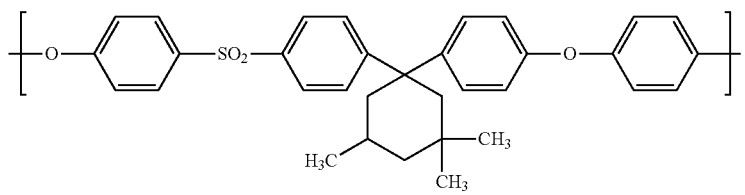

(I27)

Very particular preference is given to polyarylene ethers which comprise ($I_1$), ($I_2$), ($I_{24}$), or ($I_{25}$) as repeat units. Among these are, for example, polyarylene ether sulfones having from 0 to 100 mol %, preferably from 5 to 95 mol %, of structural units (h) and from 0 to 100 mol %, preferably from 5 to 95 mol %, of structural units ($I_2$).

The polyarylene ethers can also be copolymers or block copolymers, in each of which there are polyarylene ether segments present and segments of other thermoplastic polymers, such as polyamides, polyesters, aromatic polycarbonates, polyester carbonates, polysiloxanes, polyimides, or polyetherimides. The molar masses of the blocks or of the graft arms in the copolymers are generally in the range from 1000 to 30 000 g/mol. The blocks of different structure can have an alternating or random arrangement. The proportion by weight of the polyarylene ether segments in the copolymers or block copolymers is generally at least 3% by weight, preferably at least 10% by weight. The proportion by weight of the polyarylene ether sulfones or polyarylene ether ketones can be up to 97% by weight. Preference is given to copolymers or block copolymers whose proportion by weight of polyarylene ether segments is up to 90% by weight. Copolymers or block copolymers having from 20 to 80% by weight of polyarylene ether segments are particularly preferably used.

The average molar masses Mn (number average) of the polyarylene ethers are generally in the range from 10 000 to 60 000 g/mol, their intrinsic viscosities being from 30 to 150 ml/g. The intrinsic viscosities are measured as a function of solubility of the polyarylene ethers (A) and/or (B) either in 1% strength by weight N-methylpyrrolidone solution or in a mixture composed of phenol and o-dichlorobenzene, or in 96% strength sulfuric acid, in each case at 20° C. or, respectively, 25° C.

The polyarylene ethers are known per se or can be prepared by methods known per se.

For example, polyphenylene ethers can be prepared by oxidative coupling of phenols. Polyarylene ether sulfones or polyarylene ether ketones are produced, for example, via condensation of aromatic bishalogen compounds and of the alkali metal double salts of aromatic bisphenols. They can also by way of example be prepared via auto-condensation of alkali metal salts of aromatic halophenols in the presence of a catalyst.

The monomers are preferably polymerized in the melt or in an inert high-boiling-point solvent. Among these are chlorobenzene, dichlorobenzene, xylene, and trichlorobenzene. Alongside these, other compounds that can be used are sulfones or sulfoxides, among which are especially dimethyl sulfone, diethyl sulfone, 1,1-dioxotetrahydrothiophene (sulfolane), or diphenyl sulfone, dimethyl sulfoxide, or diethyl sulfoxide, preferably dimethyl sulfoxide. Among the preferred solvents are also N-alkylpyrrolidones, in particular N-methylpyrrolidone. It is also possible to use N-substituted acid amides, such as N,N-dimethylformamide or N,N-dimethylacetamide. It is also possible to use a mixture of different solvents.

Preferred process conditions for synthesis of polyarylene ether sulfones or of polyarylene ether ketones are described by way of example in EP-A-1 13 1 12 and 135 130.

The melting point of the preferred polyarylene ethers is generally at least 320° C. (polyarylene ether sulfones) and, respectively, at least 370° C. (polyarylene ether ketones).

According to the invention, the molding compositions can comprise polyarylene ether sulfones or polyarylene ether ketones which are obtainable via reaction of a polyarylene ether sulfone or polyarylene ether ketone with a reactive compound. The reactive compounds comprise, alongside a carbon-carbon double or carbon-carbon triple bond, one or more carbonyl, carboxylic acid, carboxylate, acid anhydride, acid imide, carboxylic ester, amino, hydroxy, epoxy, oxazoline, urethane, urea, lactam, or halobenzyl groups.

Examples of typical suitable compounds are maleic acid, methylmaleic acid, itaconic acid, tetrahydrophthalic acid, anhydrides and imides thereof, fumaric acid, the mono- and diesters of these acids, e.g. of $C_1$-$C_{10}$-alkanols, the mono- or diamides of these acids, such as N-phenylmaleimide, and maleic hydrazide. It is preferable to use alpha,beta-unsaturated dicarboxylic acids or their anhydrides, and diesters and monoesters of the general structure IV and V below.

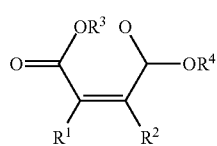

(IV)

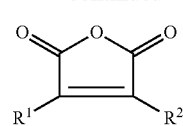

(V)

where $R^1$, $R^2$, $R^3$, and $R^4$, independently of one another, can be hydrogen or else $C_1$-$C_{18}$-alkyl groups.

Particularly suitable compounds are maleic anhydride, fumaric acid, and itaconic acid.

The polymers and the reactive compound can, for example, be reacted with one another in an aromatic solvent. Chlorobenzene, o-dichlorobenzene, and N-methyl-pyrrolidone have proven to be particularly suitable solvents. A conventional free-radical initiator is generally used here. The reaction is generally conducted at from 75 to 150° C. The reaction product is obtained via precipitation with a conventional precipitant, such as low-molecular-weight alcohol and ketone, or via removal of the solvent (e.g. in a vented extruder or thin-film evaporator).

However, by way of example, the reactants can also be reacted at a temperature of from 270-350° C. in the melt in a mixing assembly operating continuously or batchwise (e.g. a single- or twin-screw extruder or a kneader).

The reactive compound here is preferably fed in liquid form, in particular within the kneading zone of a mixing assembly, to the melt of the polymer.

It is preferable to use modified polyarylene ether sulfones or modified polyarylene ether ketones, each of which has been obtained via reaction of from 80 to 99.9% by weight, in particular from 90 to 99% by weight, of the unmodified polyarylene ether sulfones or unmodified polyarylene ether ketones with from 0.1 to 20% by weight, in particular from 1 to 10% by weight, of the reactive compound.

Polyarylene ether sulfones grafted with from 0.1 to 1.5% by weight of maleic anhydride are particularly preferred. Preference is given here to polyarylene ether sulfones comprising from 5 to 95 mol % of units $I_1$ and from 5 to 95 mol % of units $I_2$.

Mention may be made in particular here of polyarylene ether sulfones having from 80 to 95 mol %, preferably from 85 to 95 mol %, of units of the formula $I_2$ and $I_1$ and correspondingly from 5 to 20 mol %, preferably from 5 to 15 mol %, of units of the formula $I_1$ and, respectively, $I_2$.

The free-radical initiators used can generally comprise the compounds described in the technical literature (e.g. J. K. Kochi, "Free Radicals", J. Wiley, New York, 1973).

The amounts usually used of the free-radical initiators are from about 0.01 to about 1% by weight, based on the polyarylene ether sulfones or polyarylene ether ketones used. Mixtures of different free-radical initiators can, of course, also be used.

Appropriately modified polyphenylene ethers are known inter alia from WO 87/00540, and these can in particular be used in mixtures with polyamide.

As thermosetting plastic, according to the present invention, preferably an epoxy-resin is used. Epoxy-resins are known to the skilled artisan.

According to the present invention, aromatic and/or heteroaromatic epoxy resins, epoxy-composites or epoxyblends comprising aromatic and/or heteroaromatic compounds comprising epoxy-groups are understood as epoxyresins. These aromatic and/or heteroaromatic compounds may comprise polyfunctional epoxy-compounds, in which at least two epoxy-groups of general formula (A)

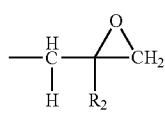
(A)

are present, which are directly bound to a carbon, oxygen-, nitrogen- or sulfur-atom and in which $R^2$ is hydrogen or methyl.

Examples of polyfunctional, aromatic and/or heteroaromatic epoxy-compounds are:

I) Polyglycidyl-esters and poly(β-methylglycidyl) esters, obtainable by reaction of an aromatic and/or heteroaromatic compound comprising at least two carboxyl-groups in the molecule with epichlorohydrine-, glycerol-dichlorhydrine- and/or β-methylepichlorhydrine. The reaction is conducted in the presence of bases. Suitable aromatic and/or heteroaromatic compounds comprising at least two carboxyl-groups in the molecule are phthalic acid, isophthalic acid, trimellit-acid and pyromellit-acid.

II) Polyglycidyl-ethers or poly(β-methylglycidyl)ethers, obtainable by reaction of an aromatic and/or heteroaromatic compound with at least two free phenolic hydroxyl-groups with a suitable substituted epichlorhydrine under basic conditions or in the presence of an acidic catalyst followed by treatment under basic conditions. Ethers of this type are for example obtainable from mononuclear phenyl like resorcinol or hydroquinone or they are based on polynuclear phenols like bis(4-hydroxyphenyl)methane, 2,2-bis(4-hydroxyphenyl)propane), 2,2-bis(3,5-dibromo-4-hydroxyphenyl)-propane or 4,4'-dihydroxyphenylsulfone; or these ethers are based on condensates of phenols with formaldehyde, which are obtained under acidic conditions like Phenol-Novolac®.

III) Poly(N-glycidyl)-compounds, obtainable by dehydrochlorination of a reaction product of epichlorohydrine and aromatic and/or heteroaromatic amines, comprising at least two amino-hydrogens. These amines are for example aniline, toluidine, bis(4-aminophenyl)methane, m-xylylenediamine or bis(4-methylaminophenyl)methane, and further N,N,O-triglycidyl-m-aminophenol or N,N,O-triglycidyl-p-aminophenol.

IV) Poly(S-decidyl)compounds like di-S-decidyl-derivatives obtainable from aromatic and/or heteroaromatic details, like bis(4-mercaptomethylphenyl)ethers.

Polyfunctional, aromatic and/or heteroaromatic epoxy-compounds are known. Many of them are commercially available from Huntsman Advanced Materials (brand name Araldite®), Dow Chemicals (brand name DER®), Mitsubishi Gas Chemical Company (trade name Tetrad®), Shell (brand name Kadura®) and Hexion Specialty Chemicals (Hexion®, Tactix®, Epon® and Epikot®), examples of suitable polyfunctional epoxides are:

a) liquid bisphenol-A-diglycidyl ethers like ARALDITE® GY 240, ARALDITE® GY 250, ARALDITE® GY 260, ARALDITE® GY 266, ARALDITE® LY 1556, ARALDITE® GY 2600, ARALDITE® MY 790, DER® 332, DER® 331, Hexion® EPR 158, Tactix® 123, Tactix® 138, Epon® 826;

b) solid bisphenol-A-diglycidyl ethers like ARALDITE® GT 6071, ARALDITE® GT 7071, ARALDITE® GT 7072, ARALDITE® GT 6063, ARALDITE® GT 7203, ARALDITE® GT 6064, ARALDITE® GT 7304, ARALDITE® GT 7004, ARALDITE® GT 6084, ARALDITE GT® 1999, ARALDITE® GT 7077, ARALDITE® GT 6097, ARALDITE® GT 7097, ARALDITE GT® 7008, ARALDITE® GT 6099, ARALDITE® GT 6608, ARALDITE® GT 6609, ARALDITE® GT 6610, ARALDITE® CT 200, ARALDITE® 6100 ES, Epikote® 1001, Epikote® 109, DER® 661, DER® 667, DER® 668, DLS 1065 ES;

c) liquid bisphenol-F-diglycidyl ethers like ARALDITE® GY 281, ARALDITE® GY 282, ARALDITE® PY 302, ARALDITE® PY 306;

d) solid polyglycidyl ethers of tetraphenyl ethane, like CG Epoxy Resin®0163;

e) solid and liquid polyglycidyl ethers of phenyl-formaldehyde Novolac® like EPN 1138, EPN 1139, GY 1180, PY 307, Epon® 828, Tactix® 556;

f) solid and liquid polyglycidyl ethers of O-cresol-formaldehyd-Novolac®, like ECN 1235, ECN 1273, ECN 1280, ECN 1299;

g) liquid glycidyl ethers of carboxylic acid like Shell Cardura® E terephthalic acid ester, trimellitic acid ester, ARALDITE® PY 284;

h) solid heterocyclic epoxy resins (triglycidyl isocyanoates), like ARALDITE® PT 810;

i) liquid N,N,O-triglycidyl ethers of p-aminophenyl, like ARALDITE® MY 0510;

j) tetraglycidyl-4-4'-methylenebenzamine or N,N,$^{N,N}$-tetraglycidyldiaminophenyl methane, like ARALDITE® MY 720, ARALDITE® MY 721;

k) tetraglycidyl-derivative of m-xylidene diamine like Tetrad®-X;

l) triglycidyl-derivative of 1,1,2-tris(4-hydroxyphenyl) ethane like Tactix® 742.

If desired, also a mixture of aromatic and/or heteroaromatic epoxy-compounds or different structures may be used.

Suitable polyfunctional, aromatic and/or heteroaromatic compounds comprise at least two groups of the general formula

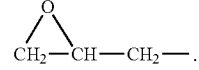

Particularly preferred components are shown with the following compounds or types and/or mixtures thereof:

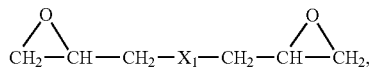

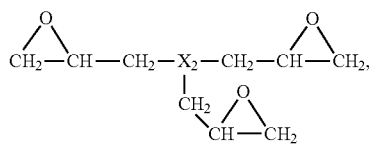

-continued

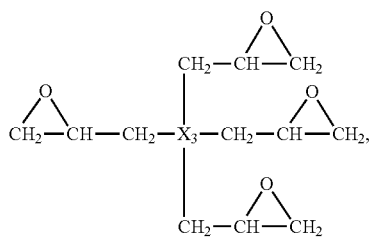

wherein $X_1$, $X_2$ and $X_3$ are phenylene or naphtylene, which may be unsubstituted or substituted, and $X_2$ is, in addition, an unsubstituted or substituted radical or formula

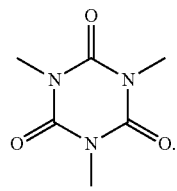

Suitable substituents for the above mentioned radicals are —O—, —S—, —C(=O)—, —C(=O)—O—, —S(=O)=, —S(O$_2$)—, —C(CF$_3$)$_2$-alkyl, alkylene, aryl, arylene, alkoxy, aryloxy or halogene. Identical or different substituents may be present one or two times, wherein the substituents may optionally further be substituted.

An example for a suitable alkyl radical is a $C_1$-$C_{18}$-alkyl radical like methyl, ethyl, n-propyl, iso-propyl, n-butyl, sec-butyl, tert.-butyl, n-hexyl, n-octyl, 2-ethylhexyl, n-nonyl, n-decyl, n-undecyl, n-dodecyl, n-tridecyl, n-tetradecyl, n-hexadecyl or n-octadecyl and their branched isomers.

Exemplary alkylene- and alkoxy radicals can be obtained from the above-mentioned alkyl radicals by elimination of a further hydrogen atom or by addition of an oxygen atom.

Examples of suitable aryl-radicals are radicals having 6 to 20 carbon atoms like phenylene, biphenylene or naphthylene.

Suitable arylene- and aryloxy-radicals can be formally obtained from the above-mentioned aryl-radicals by elimination of a further hydrogen or by addition of an oxygen atom. Preferred are radicals of the following formulas for $X_1$:

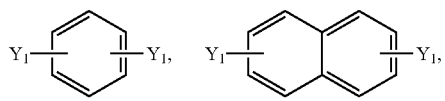

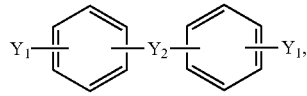

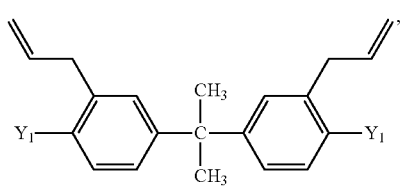

-continued

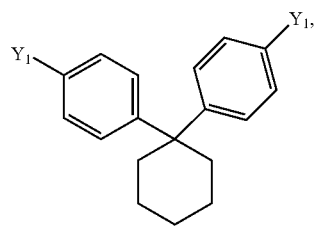

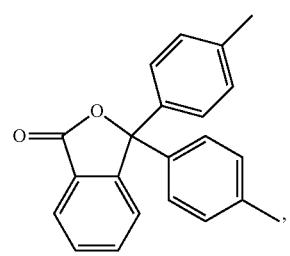

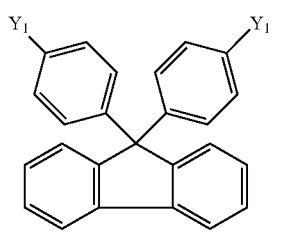

or

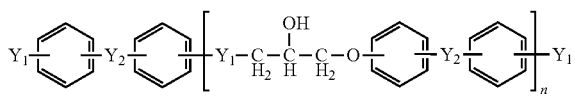

For $X_2$:

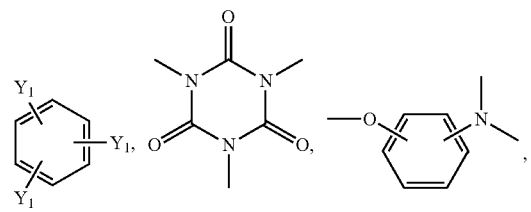

or

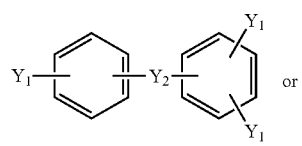

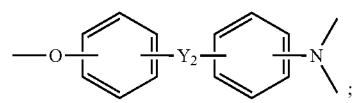

For $X_3$:

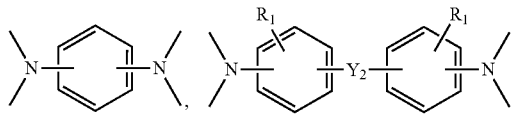

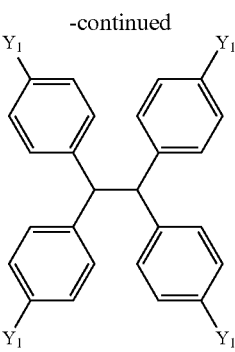
in which $Y_1$ is a direct bond or the groups —O—, —S— or —C(=O)—O—,
$Y_2$ is a direct bond or the groups $SO_2$, —CO—, —S—, —SO—, —CH$_2$—, —C(CH$_3$)$_2$— or —C(CF$_3$)$_2$—
and n is 1 to 10.
The aromatic groups are unsubstituted or substituted once or twice by alkyl, aryl, alkoxy, aryloxy or halogen, like mentioned above in detail.
Particularly preferred are the following compounds
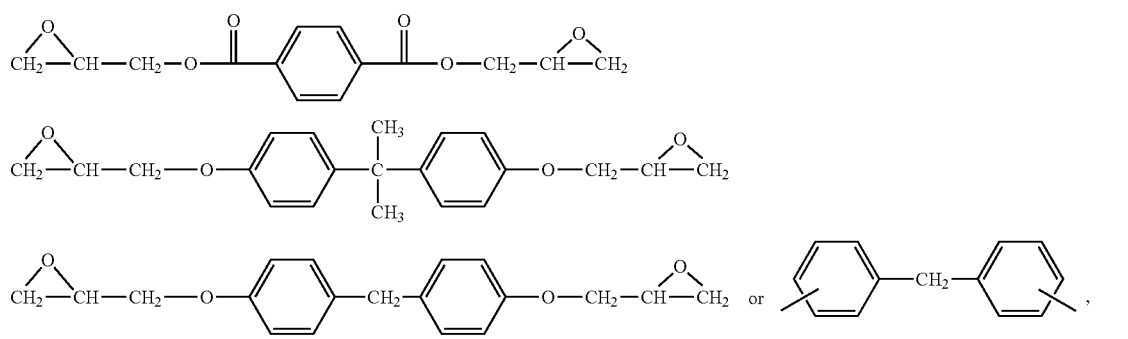
Bisphenol-F
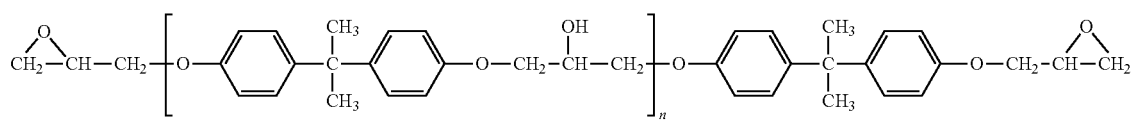
(n-1-10)
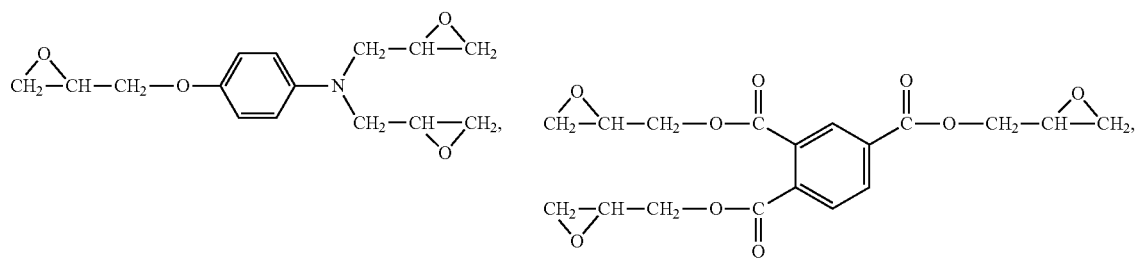
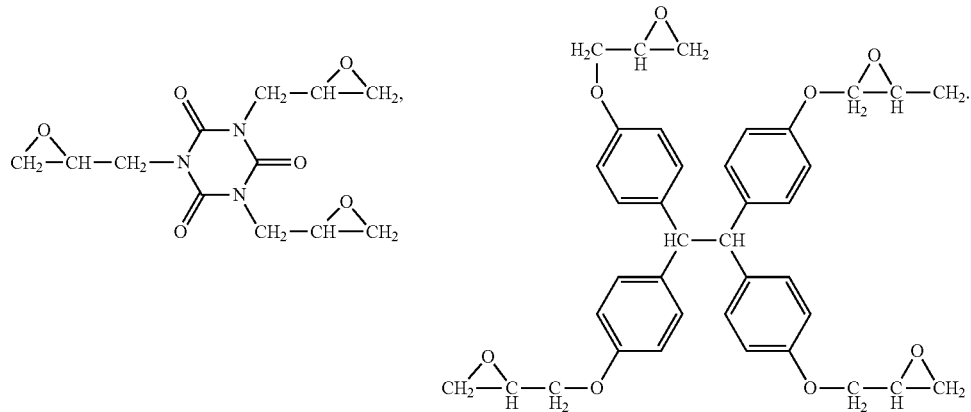

According to a preferred embodiment, a hardening component may be present in the aromatic and/or heteroaromatic epoxy-resin-composition or in the composition comprising aromatic and/or heteroaromatic epoxy-resin-composition and further polymerisabie monomers. A suitable hardening-compound can be any hardening compound for aromatic and/or heteroaromatic epoxy-resins, known to the skilled artisan. Amine- and anhydride-hardeners are particularly preferred, in addition to polyamines, for example ethylene diamine, diethylene triamine, triethylene triamine, hexamethylene diamine, methane diamin, N-aminoethylpiperazine, diaminodiphenylmethane (DDM), alkyl-substituted derivatives of DDM, isofurone diamine (IPD), diaminodiphenylsulfone (DDS), 4,4'-methylenedianiline (MDA) or m-phenylene diamine (MPDA), polyamide, alkyl-alkenylimidazole, dicyanodiamide (DICY), 1,6-hexymethylene-bis-cyanoguanidine, or acid anhydrides, for example dodecenyl-succinic acid-anhydride, hexahydrophthalic acid anhydride, tetrahydrophthalic acid anhydride, phthalic acid anhydride, pyromelit acid anhydride and derivatives thereof.

Compound A

The mixture of the invention comprises, alongside the at least one plastic K, from 0.1 to 50% by weight, based on the entire mixture, of at least one compound A, selected from the group consisting of borophosphates, borate phosphates, metalloborophosphates, and mixtures thereof.

It is preferable to use compounds A selected from the group mentioned and having a decomposition temperature which is above the processing temperature of the thermoplastic preferably used as plastic K, examples being from 0 to 1500° C., preferably from 100 to 900° C., particularly preferably from 101 to 700° C., very particularly preferably from 150 to 600° C. In the case of the preferred thermoplastics K, in particular polyesters, such as polybutylene terephthalate, or polyamides, such as nylon-6 or nylon-6,6, the compounds A preferably used have to have a decomposition temperature which is generally above 150° C., preferably above 200° C., particularly preferably above 250° C., in particular above 280° C.

It is particularly preferable to use compounds A which are halogen-free.

It is further preferable to use compounds A which, under standard conditions, are an amorphous powder, or crystalline or glassy.

In another particularly preferred variant of the present invention, compounds A are used which comprise OH groups, water, organic molecules, or combinations thereof, these being released in the event of a fire.

In one preferred embodiment of the mixture of the invention, the at least one compound A is a borophosphate selected from the group consisting of $Mg_3(H_2O)_6[\{BPO_4(OH)_3\}_2]$, $Mn[BPO_4(OH)_2]$, $Fe[BPO_4(OH)_2]$, $Co[BPO_4(OH)_2]$, $Fe[B_2P_2O_7(OH)_5]$, $Fe[B_2P_2O_7(OH)_5].H_2O$, $Ga[B_2P_2O_7(OH)_5]$, $Al[B_2P_2O_7(OH)_5].H_2O$, $Al[B_2P_2O_7(OH)_5]$, $Ca[BPO_5]$, $Sr[BPO_5]$, $Ba[BPO_5]$, $Li_3[B_6PO_{13}]$, $Li_3[BP_2O_8]$, $Na_3[B_6PO_{13}]$, $Na_3[BP_2O_8]$, $K_3[B_6PO_{13}]$, $K_3[BP_2O_8]$, $Rb_3[B_6PO_{13}]$, $Cs_3[BP_2O_8]$, $Pb[BPO_5]$, $Mg(H_2O)_2[BPO_4(OH)_2]$, $(Mg_{1-x}Ni_x)(H_2O)_2[BPO_4(OH)_2]$ (x=0-1, in particular 0.1, 0.25, 0.3, 0.4, 0.5, 0.6, 0.7, 0.75, 0.8, 0.9, 1.0), $Cu(H_2O)_2[B_2P_2O_8(OH)_2]$, $Mg(H_2O)_2[B_2P_2O_8(OH)_2].H_2O$, $(Mg_{1-x}Co_x)(H_2O)_2[B_2P_2O_8(OH)_2].H_2O$ where (x=0-1, in particular 0.1, 0.25, 0.3, 0.4, 0.5, 0.6, 0.7, 0.75, 0.8, 0.9, 1.0), $[Co(en)_3][B_2P_3O_{11}(OH)_2]$ (en=ethylenediamine), $Rb_2Co_3(H_2O)_2[B_4P_6O_{24}(OH)_2]$, $(C_2H_{10}N_2)Mg[B_2P_3O_{12}(OH)]$, $(C_4N_2H_{12})Mn[B_2P_3O_{12}(OH)]$, $(C_2H_{10}N_2)(M)[B_2P_3O_{12}(OH)]$ (M=Mn, Fe, Co, Ni, Cu, Zn, Mg, Ca, Cd), $(C_2H_{10}N_2)Cd[B_2P_3O_{12}(OH)]$, $(C_4H_{16}N_3)Cd[B_2P_3O_{12}(OH)]Cl$, $Na_5[B_2P_3O_{13}]$, $Sr_6BP_5O_{20}$, $Ca_6BP_5O_{20}$, $Mg_6BP_5O_{20}$, $Ba_6BP_5O_{20}$, $Ca_6[BP_4O_{16}][PO_4]$, $Sr_6[BP_4O_{16}][PO_4]$, $Mg_6[BP_4O_{16}][PO_4]$, $Ba_6[BP_4O_{16}][PO_4]Mn(C_3H_{12}N_2)[B_2P_3O_{12}(OH)]$, $Mn(C_4H_{12}N_2)[B_2P_3O_{12}(OH)]$, $Co(C_4H_{12}N_2)[B_2P_3O_{12}(OH)]$, $Zn(C_4H_{12}N_2)[B_2P_3O_{12}(OH)]$, $Mn(C_6H_{14}N_2)_{0.5}(C_4H_{12}N_2)[B_2P_3O_{12}(OH)]$, $Rb_3[B_2P_3O_{11}(OH)_2]$, $(NH_4)_2(C_3H_{12}N_3)_8[V_2P_2BO_{12}]_6.15H_2O$, $[TETA]_4H(NH_4)(VO)_{12}\{BP_2O_{10}\}_6].14H_2O$ (TETA=triethylenetetramine), $[TETA]_4H[(NH_4)(VO)_{12}\{BP_2O_{10}\}_6].16H_2O$ (TETA=triethylenetetramine), $[TETA]_4H[K(VO)_{12}\{BP_2O_{10}\}_6].14H_2O$ (TETA=triethylenetetramine), $[TETA]_4H[K(VO)_{12}\{BP_2O_{10}\}_6].16H_2O$ (TETA=triethylenetetramine), $(NH_4)_x(C_nH_{2n+1}NH_3)_y[(NH_4)V_2P_2BO_{12}]_6$ (n=1, 2, 3, 4, 5, 6, 7, 8, 9, 10, 11, 12, 13, 14, 15, 16, 17, 18, 19, 20), $(C_4H_{12}N_2)_6[(VO)_2BP_2O_{10}]_4.zH_2O$ (z=1, 2, 3, 4, 5, 6, 7, 8, 9, 10, 11, 12, 13, 14, 15, 16, 17, 18, 19, 20), $Na_{14}[Na\{(VO)_2BP_2O_{10}\}_5].nH_2O$ (n=1, 2, 3, 4, 5, 6, 7, 8, 9, 10, 11, 12, 13, 14, 15, 16, 17, 18, 19, 20), $(NH_4)_{17}[(NH_4)_{}\{(VO)_2BP_2O_{10}\}_6].nH_2O$ (n=1, 2, 3, 4, 5, 6, 7, 8, 9, 10, 11, 12, 13, 14, 15, 16, 17, 18, 19, 20), $(A)_{17}[(A)\{(VO)_2BP_2O_{10}\}_6].nH_2O$ (A=NH$_4$, Li, Na, K, Cs, Rb, Ag, Tl) (n=1, 2, 3, 4, 5, 6, 7, 8, 9, 10, 11, 12, 13, 14, 15, 16, 17, 18, 19, 20), $[C_2H_{10}N_2]_2[(VO)_5(H_2O)\{BP_2O_{10}\}_2]1.5H_2O$, $Na_2[VB_3P_2O_{12}(OH)].2.92H_2O$, $(NH_4)_2(C_2H_{10}N_2)_6[Sr(H_2O)_5]_2[V_2BP_2O_{12}]_6.10H_2O$, $(NH_4)_2(C_3H_{12}N_2)_6[Sr(H_2O)_4]_2[V_2BP_2O_{12}]_6.17H_2O$, $(NH_4)_2(C_3H_{12}N_3)_8[V_2P_2BO_{12}]_6.15H_2O$, $[TETA]_4H[(NH_4)(VO)_{12}\{BP_2O_{10}\}_6].14H_2O$ (TETA=triethylenetetramine), $[TETA]_4H[(NH_4)(VO)_{12}\{BP_2O_{10}\}_6].16H_2O$ (TETA=triethylenetetramine), $[TETA]_4H[K(VO)_{12}\{BP_2O_{10}\}_6].14H_2O$ (TETA=triethylenetetramine), $[TETA]_4H[K(VO)_{12}\{BP_2O_{10}\}_6].16H_2O$ (TETA=triethylenetetramine), $(NH_4)_x(C_nH_{2n+1}NH_3)_y[(NH_4)V_2P_2BO_{12}]_6$ (n=1, 2, 3, 4, 5, 6, 7, 8, 9, 10, 11, 12, 13, 14, 15, 16, 17, 18, 19, 20), $(C_4H_{12}N_2)_6[(VO)_2BP_2O_{10}]_4.zH_2O$ (z=2, 6, 14), $(NH_4)_{17}[(NH_4)\{(VO)_2BP_2O_{10}\}_6].nH_2O$ (n=1, 2, 3, 4, 5, 6, 7, 8, 9, 10, 11, 12, 13, 14, 15, 16, 17, 18, 19, 20), $[C_2H_{10}N_2]_2[(VO)_5(H_2O)\{BP_2O_{10}\}_2].1.5H_2O$, $(C_2H_{10}N_2)_2[B_2P_4O_{14}(OH)_2]$, $(N_2C_3H_5)_{3.8}(H_3O)_{1.2}[(VO)_4B_2P_5O_{22}].0.3H_2O$, $(C_6H_{14}N_2)_2[VOB_2P_5O_{16}(OH)_5].H_2O.H_3PO_4$, $(NH_4)_5[V_3BP_3O_{19}].H_2O$, $(C_3N_2H_5)_8[Mo_{12}B_2P_8O_{59}(OH)_3].4H_2O$, $[C_6H_{14}N_2]_2[VOB_3P_4O_{15}(OH)_5].4H_2O$, $(ImH_2)[Mo^V{}_5Mo^{VI}{}_7O_{30}(BPO_4)_2(O_3P\text{-}Ph)_6]$ (Im=imidazole, Ph=phenyl), $Na_2[VB_3P_2O_{12}(OH)].2.92H_2O$, $(NH_4)_3(C_4H_{14}N_2)_{4.5}[Sr(H_2O)_5]_2[Sr(H_2O)_4][V_2BP_2O_{12}]_6.10H_2O$, $(NH_4)_x(C_nH_{2n+1}NH_3)_y[(NH_4)V_2P_2BO_{12}]_6$ (x=1, 2, 3, 4, 5, 6, 7, 8, 9, 10, 11, 12, 13, 14, 15, 16, 17, 18, 19, 20) (n=1, 2, 3, 4, 5, 6, 7, 8, 9, 10, 11, 12, 13, 14, 15, 16, 17, 18, 19, 20), $(C_2H_{10}N_2)_2[Na(VO)_{10}\{BP_2O_8(OH)_2\}_5].22.5H_2O$, $CsV_3(H_2O)_2[B_2P_4O_{16}(OH)_4]$, $LiCu_2[BP_2O_8(OH)_2]$, $(C_3H_{12}N_2)Fe^{III}{}_6[B_4P_8O_{32}(OH)_8]$, $K_5\{W_4O_{10}[BP_2O_8(OH)_2][HPO_4]_2\}.0.5H_2O$, $Mg_2[BP_2O_7(OH)_3]$, $NaAl[BP_2O_7(OH)_3]$, $NaV[BP_2O_7(OH)_3]$, $NaFe[BP_2O_7(OH)_3]$, $NaGa[BP_2O_7(OH)_3]$, $NaIn[BP_2O_7(OH)_3]$, $CaNi[BP_2O_7(OH)_3]$, $NH_4V[BP_2O_8(OH)]$, $NH_4Fe[BP_2O_8(OH)]$, $NH_4(Fe_{1-x}V_x)[BP_2O_8(OH)]$ (x=0.1, 0.2, 0.3, 0.4, 0.47, 0.5, 0.53, 0.6, 0.7, 0.8, 0.9), $NH_4Al[BP_2O_8(OH)]$, $NH_4Ga[BP_2O_8(OH)]$, $RbV[BP_2O_8(OH)]$, $RbFe[BP_2O_8(OH)]$, $Rb(Fe_{1-x}V_x)[BP_2O_8(OH)]$ (x=0.1, 0.2, 0.3, 0.4, 0.47, 0.5, 0.53, 0.6, 0.7, 0.8, 0.9), $RbAl[BP_2O_8(OH)]$, $RbGa[BP_2O_8(OH)]$, $CsV[BP_2O_8(OH)]$, $CsFe[BP_2O_8(OH)]$, $Cs(Fe_{1-x}V_x)[BP_2O_8(OH)]$ (x=0.1, 0.2, 0.3, 0.4, 0.47, 0.5, 0.53, 0.6, 0.7, 0.8, 0.9), $CsAl[BP_2O_8(OH)]$, $CsGa[BP_2O_8(OH)]$, $Pb_2[BP_2O_8(OH)]$, $NH_4Sc[BP_2O_8(OH)]$, $NH_4Fe[BP_2O_8(OH)]$, $NH_4In[BP_2O_8(OH)]$, $KSc[BP_2O_8(OH)]$, $RbSc[B_2P_3O_{11}(OH)_3]$, $CsSc[B_2P_3O_{11}(OH)_3]$, $KFe[BP_2O_8(OH)]$, $KIn[BP_2O_8(OH)]$, $RbSc[BP_2O_8(OH)]$, $RbSc[BP_2O_8(OH)]$, $CsFe[BP_2O_8(OH)]$, $RbIn[BP_2O_8(OH)]$, $PbCo[BP_2O_8(OH)]$, $PbZn[BP_2O_8(OH)]$, $Sc(H_2O)_2[BP_2O_8].H_2O$, $Fe(H_2O)_2[BP_2O_8].H_2O$, $In(H_2O)_2[BP_2O_8].H_2O$, $Sc(H_2O)_2$

[BP$_2$O$_8$], In(H$_2$O)$_2$[BP$_2$O$_8$], In[BP$_2$O$_8$].0.8H$_2$O, NH$_4$Mg(H$_2$O)$_2$[BP$_2$O$_8$].H$_2$O, NH$_4$(M)(H$_2$O)$_2$[BP$_2$O$_8$].H$_2$O (M=Mn, Fe, Co, Ni, Cu, Zn, Mg, Ca, Cd), (Li—K)Mg(H$_2$O)$_2$[BP$_2$O$_8$].H$_2$O, (A)(Mn—Zn)(H$_2$O)$_2$[BP$_2$O$_8$].H$_2$O A=NH$_4$, Li, Na, K, Rb, Cs, Ag, Tl), (NH$_4$)(M)(H$_2$O)$_2$[BP$_2$O$_8$].H$_2$O (M=Mn, Fe, Co, Ni, Cu, Zn, Mg, Ca, Cd), NH$_4$Mg(H$_2$O)$_2$[BP$_2$O$_8$].H$_2$O, (H$_3$O)Zn(H$_2$O)$_2$[BP$_2$O$_8$].H$_2$O, NaCd(H$_2$O)$_2$[BP$_2$O$_8$].0.8H$_2$O, (NH$_4$)Cd(H$_2$O)$_2$[BP$_2$O$_8$].0.72H$_2$O, (NH$_4$)Cd(H$_2$O)$_2$[BP$_2$O$_8$].H$_2$O, KFe(H$_2$O)$_2$[BP$_2$O$_8$].0.5H$_2$O, KFe(H$_2$O)$_2$[BP$_2$O$_8$].H$_2$O, Rb$_{3-2x}$Mg$_x$(H$_2$O)$_2$[BP$_2$O$_8$].zH$_2$O (z=0-1, for example 0.1, 0.2, 0.3, 0.4, 0.5, 0.6, 0.7, 0.8, 0.9, in particular z=1) (x=0-1.5, for example 0.1, 0.2, 0.3, 0.4, 0.5, 0.6, 0.7, 0.8, 0.9, 1.0, 1.5, in particular x=1, 1.5), Rb$_{3-2x}$Mn$_x$(H$_2$O)$_2$[BP$_2$O$_8$].zH$_2$O (z=0-1, for example 0.1, 0.2, 0.3, 0.4, 0.5, 0.6, 0.7, 0.8, 0.9, in particular z=1) (x=0-1.5, for example 0.1, 0.2, 0.3, 0.4, 0.5, 0.6, 0.7, 0.8, 0.9, 1.0, 1.5, in particular x=1, 1.5), Rb$_{3-2x}$Co$_x$(H$_2$O)$_2$[BP$_2$O$_8$].zH$_2$O (z=0-1, for example 0.1, 0.2, 0.3, 0.4, 0.5, 0.6, 0.7, 0.8, 0.9, in particular z=1) (x=0-1, for example 0.1, 0.2, 0.3, 0.4, 0.5, 0.6, 0.7, 0.8, 0.9, 1.0, 1.5 in particular x=1, 1.5), Rb$_{3-2x}$Fe$_x$(H$_2$O)$_2$[BP$_2$O$_8$].zH$_2$O (z=0-1, for example 0.1, 0.2, 0.3, 0.4, 0.5, 0.6, 0.7, 0.8, 0.9, in particular z=1) (x=0-1.5, for example 0.1, 0.2, 0.3, 0.4, 0.5, 0.6, 0.67, 0.7, 0.75, 0.8, 0.9, 1.0, 1.5, in particular x=1, 0.67, 0.75, 1.5), Cs$_{3-2x}$Mg$_x$(H$_2$O)$_2$[BP$_2$O$_8$].zH$_2$O (z=0-1, for example 0.1, 0.2, 0.3, 0.4, 0.5, 0.6, 0.7, 0.8, 0.9, in particular z=1) (x=0-1, for example 0.1, 0.2, 0.3, 0.4, 0.5, 0.6, 0.7, 0.8, 0.9, 1.0, in particular x=1, 1.5), Cs$_{3-2x}$Mn$_x$(H$_2$O)$_2$[BP$_2$O$_8$].zH$_2$O (z=0-1, for example 0.1, 0.2, 0.3, 0.4, 0.5, 0.6, 0.7, 0.8, 0.9, in particular z=1) (x=0-1.5, for example 0.1, 0.2, 0.3, 0.4, 0.5, 0.6, 0.7, 0.8, 0.9, 1.0, 1.5, in particular x=1, 1.5), Cs$_{3-2x}$Co$_x$(H$_2$O)$_2$[BP$_2$O$_8$].zH$_2$O (z=0-1, for example 0.1, 0.2, 0.3, 0.4, 0.5, 0.6, 0.7, 0.8, 0.9, in particular z=1) (x=0-1.5, for example 0.1, 0.2, 0.3, 0.4, 0.5, 0.6, 0.67, 0.7, 0.75, 0.8, 0.9, 1.0, 1.5, in particular x=1, 0.67, 0.75, 1.5), Cs$_{3-2x}$Fe$_x$(H$_2$O)$_2$[BP$_2$O$_8$].zH$_2$O (z=0-1, for example 0.1, 0.2, 0.3, 0.4, 0.5, 0.6, 0.7, 0.8, 0.9, in particular z=1) (x=0-1, for example 0.1, 0.2, 0.3, 0.4, 0.5, 0.6, 0.67, 0.7, 0.75, 0.8, 0.9, 1.0, 1.5, in particular x=1, 0.67, 0.75, 1.5), (H$_3$O)$_{0.5}$Co$_{1.25}$(H$_2$O)[BP$_2$O$_8$].H$_2$O, (H$_3$O)$_{0.5}$Mn$_{1.25}$(H$_2$O)[BP$_2$O$_8$].H$_2$O, (NH$_4$)$_{0.4}$Fe$^{II}_{0.55}$Fe$^{III}_{0.5}$(H$_2$O)$_2$[BP$_2$O$_8$].0.6H$_2$O, (NH$_4$)$_{0.5}$Fe$^{II}_{0.5}$Fe$^{III}_{0.5}$(H$_2$O)$_2$[BP$_2$O$_8$].0.5H$_2$O, {(NH$_4$)$_{3-2x}$Co$_x$}(H$_2$O)$_2$[BP$_2$O$_8$].zH$_2$O where (x=0-1.5, for example 0, 0.1, 0.2, 0.3, 0.4, 0.5, 0.6, 0.7, 0.8, 0.9, 1.0, 1.5, in particular x=1, 1.5) (z=0-1, in particular z=0, 0.1, 0.2, 0.3, 0.4, 0.5, 0.6, 0.7, 0.8, 0.9, 1.0), Ca$_{0.5}$Ni(H$_2$O)$_2$[BP$_2$O$_8$].H$_2$O, (Mg$_{1-x}$(Mg—Ba)$_x$)$_{1.5}$(H$_2$O)$_2$[BP$_2$O$_8$].zH$_2$O (x=0-1, for example 0, 0.1, 0.2, 0.3, ⅓, 0.4, 0.5, 0.6, ⅔, 0.7, 0.8, 0.9, 1.0, in particular x=1, 0, ⅓, ⅔) (z=0-1, in particular z=0, 0.1, 0.2, 0.3, 0.4, 0.5, 0.6, 0.7, 0.8, 0.9, 1.0), (Mg$_{1-x}$Mn$_x$)$_{1.5}$(H$_2$O)$_2$[BP$_2$O$_8$].zH$_2$O (x=0-1, 0, 0.1, 0.2, 0.3, ⅓, 0.4, 0.5, 0.6, ⅔, 0.7, 0.8, 0.9, 1.0, in particular x=1, 0, ⅓, ⅔) (z=0-1, in particular z=0, 0.1, 0.2, 0.3, 0.4, 0.5, 0.6, 0.7, 0.8, 0.9, 1.0), (Mg$_{1-x}$Fe$_x$)$_{1.5}$(H$_2$O)$_2$[BP$_2$O$_8$].zH$_2$O (x=0-1, in particular 0, 0.1, 0.2, 0.3, ⅓, 0.4, 0.5, 0.6, ⅔, 0.7, 0.8, 0.9, 1.0, in particular x=1, 0, ⅓, ⅔) (z=0-1, in particular z=0, 0.1, 0.2, 0.3, 0.4, 0.5, 0.6, 0.7, 0.8, 0.9, 1.0), (Mg$_{1-x}$Co$_x$)$_{1.5}$(H$_2$O)$_2$[BP$_2$O$_8$].zH$_2$O (x=0-1, 0, 0.1, 0.2, 0.3, ⅓, 0.4, 0.5, 0.6, ⅔, 0.7, 0.8, 0.9, 1.0, in particular x=1, 0, ⅓, ⅔) (z=0-1, in particular z=0, 0.1, 0.2, 0.3, 0.4, 0.5, 0.6, 0.7, 0.8, 0.9, 1.0), (Mg$_{1-x}$Zn$_x$)$_{1.5}$(H$_2$O)$_2$[BP$_2$O$_8$].zH$_2$O (x=0-1, 0, 0.1, 0.2, 0.3, ⅓, 0.4, 0.5, 0.6, ⅔, 0.7, 0.8, 0.9, 1.0, in particular x=1, 0, ⅓, ⅔) (z=0-1, in particular z=0, 0.1, 0.2, 0.3, 0.4, 0.5, 0.6, 0.7, 0.8, 0.9, 1.0), Na$_3$[BP$_2$O$_8$], (C$_2$H$_{10}$N$_2$)$_2$[B$_2$P$_4$O$_{14}$(OH)$_2$], K$_6$Cu$_3$[B$_2$P$_4$O$_{15}$(OH)$_6$], Zn$_3$(C$_6$H$_{14}$N$_2$)$_4$[B$_6$P$_{12}$O$_{39}$(OH)$_{12}$][HPO$_4$], Na$_4$Cu$_3$[B$_2$P$_4$O$_{15}$(OH)$_2$].2HPO$_4$, (C$_4$H$_{12}$N$_2$)$_3$Fe$^{III}_6$(H$_2$O)$_4$[B$_6$P$_{12}$O$_{50}$(OH)$_2$].2H$_2$O, Na$_2$[BP$_2$O$_7$(OH)], (Na$_{1.89}$Ag$_{0.11}$)$_2$[BP$_2$O$_7$(OH)], (N$_2$C$_3$H$_5$)$_{3.8}$(H$_3$O)$_{1.2}$[(VO)$_4$B$_2$P$_5$O$_{22}$].0.3H$_2$O, (C$_6$H$_{14}$N$_2$)$_2$[VOB$_2$P$_5$O$_{16}$(OH)$_5$].

H$_2$O.H$_3$PO$_4$, (NH$_4$)$_5$[V$_3$BP$_3$O$_{19}$].H$_2$O, [Co(en)$_3$][enH$_2$][V$_3$BP$_3$O$_{19}$].4.5H$_2$O (en=ethylenediamine), (NH$_4$)$_4$Mn$_9$[BP$_3$O$_{11}$(OH)$_2$]$_2$[HPO$_4$]$_2$[PO$_4$]$_2$, [Co(en)$_3$][V$_3$BP$_3$O$_{19}$][H$_2$PO$_4$].4H$_2$O (en=ethylenediamine), Mg$_2$(H$_2$O)[BP$_3$O$_9$(OH)$_4$], Ba$_3$[BP$_3$O$_{12}$], Pb$_3$[BP$_3$O$_{12}$], K$_3$[BP$_3$O$_9$(OH)$_3$], Pb$_6$[BP$_4$O$_{16}$][PO$_4$], Sr$_6$[BP$_4$O$_{16}$][PO$_4$], (C$_3$N$_2$H$_5$)$_8$[Mo$_{12}$B$_2$P$_8$O$_{59}$(OH)$_3$].4H$_2$O, Co$_5$[BPO$_6$][PO$_4$]$_2$, Cr$_2$[BP$_3$O$_{12}$], Fe$_2$[BP$_3$O$_{12}$], V$_2$[BP$_3$O$_{12}$], [C$_6$H$_{14}$N$_2$]$_2$[VOB$_3$P$_4$O$_{15}$(OH)$_5$].4H$_2$O, Na$_2$Cu[B$_3$P$_2$O$_{11}$(OH)].0.67H$_2$O, Na$_2$Mg[B$_3$P$_2$O$_{11}$(OH)].0.67H$_2$O, Na$_2$(Mn—Zn)[B$_3$P$_2$O$_{11}$(OH)].0.67H$_2$O, Na$_5$(H$_3$O)Mg$_3$[B$_3$P$_2$O$_{11}$(OH)]$_3$.2H$_2$O, Na$_5$(H$_3$O)(Mn—Zn)$_3$[B$_3$P$_2$O$_{11}$(OH)]$_3$.2H$_2$O, (NH$_4$)$_2$[B$_3$PO$_7$(OH)$_2$], (NH$_4$)[B$_3$PO$_6$(OH)$_3$].0.5H$_2$O, Li[B$_3$PO$_6$(OH)$_3$], K$_3$[B$_5$PO$_{10}$(OH)$_3$], K[B$_6$PO$_{10}$(OH)$_4$], Na$_3$[B$_6$PO$_{13}$], (C$_2$H$_{10}$N$_2$)[BPO$_4$F$_2$], (NH$_4$)[BPO$_4$F], (ImH$_2$)[Mo$^V_5$Mo$^{VI}_7$O$_{30}$(BPO$_4$)$_2$(O$_3$P-Ph)$_6$] (Im=imidazole, Ph=phenyl), Zn[BPO$_4$(OH)$_2$], Ni[BPO$_4$(OH)$_2$], and mixtures of these.

In one particularly preferred embodiment of the mixture of the invention, the at least one compound A is a halogen-free borophosphate selected from the abovementioned group.

In another particularly preferred embodiment of the mixture of the invention, the at least one compound A is a borophosphate which comprises OH groups, water, organic molecules, or a combination thereof, these being released in the event of a fire.

In another preferred embodiment of the mixture of the invention, the at least one compound A is a borophosphate which comprises no metal atom in the cationic moiety of the compound, very particularly selected from the group consisting of n-alkylamine borophosphates (C$_n$NH$_x$)$_y$[B$_a$P$_b$O$_c$(OH)$_d$].zH$_2$O (n=1, 2, 3, 4, 5, 6, 7, 8, 9, 10, 11, 12, 13, 14, 15) (x=2, 3) (y=1, 2, 3, 4, 5, 6, 7, 8) (a=1, 2, 3, 4, 5, 6, 7, 8) (b=1, 2, 3, 4, 5, 6, 7, 8) (c=4, 5, 6, 7, 8, 9, 10, 11, 12, 13, 14, 15, 16, 17, 18, 19, 20) (d=0, 1, 2, 3, 4, 5, 6, 7, 8, 9, 10, 11, 12, 13, 14, 15, 16, 17, 18, 19, 20) (z=1, 2, 3, 4, 5, 6, 7, 8, 9, 10), and also secondary, tertiary, and aromatic amine borophosphates (C$_n$N$_m$H$_x$)$_y$[B$_a$P$_b$O$_c$(OH)$_d$].zH$_2$O (n=1, 2, 3, 4, 5, 6, 7, 8, 9, 10, 11, 12, 13, 14, 15) (m=1, 2, 3, 4, 5, 6, 7, 8, 9, 10, 11, 12, 13, 14, 15) (x=2, 3) (y=1, 2, 3, 4, 5, 6, 7, 8) (a=1, 2, 3, 4, 5, 6, 7, 8) (b=1, 2, 3, 4, 5, 6, 7, 8) (c=4, 5, 6, 7, 8, 9, 10, 11, 12, 13, 14, 15, 16, 17, 18, 19, 20) (d=0, 1, 2, 3, 4, 5, 6, 7, 8, 9, 10, 11, 12, 13, 14, 15, 16, 17, 18, 19, 20) (z=1, 2, 3, 4, 5, 6, 7, 8, 9, 10), and mixtures thereof.

In another particularly preferred embodiment of the mixture of the invention, the at least one compound A comprises a borophosphate which comprises no metal atom, very particularly selected from the group consisting of (C$_2$H$_{10}$N$_2$)[BPO$_4$F$_2$], (NH$_4$)[BPO$_4$F], NH$_4$[BPO$_4$F], (melamine-H$_c$)$_n$[B$_x$P$_y$O$_z$(OH)$_a$].bH$_2$O (n=1-10, in particular 1, 2, 3, 4, 5, 6, 7, 8, 9) (x=1-10, in particular 1, 2, 3, 4, 5, 6, 7, 8) (y=1-10, in particular 1, 2, 3, 4, 5, 6, 7, 8) (b=0, 1, 2, 3, 4, 5, 6, 7, 8, 9, 10) (c=0, 1, 2, 3, 4, 5, 6), and mixtures thereof.

In one particularly preferred embodiment of the mixture of the invention, the at least one compound A is a borophosphate selected from the group consisting of Rb$_3$[B$_2$P$_3$O$_{11}$(OH)$_2$], K$_3$[BP$_3$O$_9$(OH)$_3$], K$_3$[B$_5$PO$_{10}$(OH)$_3$], KAl[BP$_2$O$_8$(OH)], (C$_2$H$_{10}$N$_2$)[BPO$_4$F$_2$], NH$_4$[BPO$_4$F], (C$_6$H$_{14}$N$_2$){Zn[ZnB$_2$P$_4$O$_{15}$(OH)$_2$].(C$_6$H$_{13}$N$_2$)Cl}, (C$_3$H$_{12}$N$_2$)Fe$_6$(H$_2$O)$_4$[B$_4$P$_8$O$_{32}$(OH)$_8$], (C$_3$H$_{12}$N$_2$)$_3$Fe$^{III}_6$(H$_2$O)$_4$[B$_6$P$_{12}$O$_{50}$(OH)$_2$].2H$_2$O, (C$_3$H$_{12}$N$_2$)$_3$Fe$^{III}_6$(H$_2$O)$_4$[B$_6$P$_{12}$O$_{50}$(OH)$_2$].2H$_2$O, Zn[BPO$_4$(OH)$_2$], and mixtures thereof.

Borophosphates that can be used in the invention can be produced by any of the processes known to the person skilled in the art, for example those disclosed in the article *Structural Chemistry of Borophosphates and Related Compounds*, B.

Ewald, Y.-X. Huang and R. Kniep, Z. Anorg. Chem. 2007, 633, 1517-1540, and in particular in the references cited therein.

In another preferred embodiment of the mixture of the invention, the at least one compound A is a borate phosphate selected from the group consisting of $Zn_3[BO_3][PO_4]$, $Mg_3[BO_3][PO_4]$, $Co_3[BO_3][PO_4]$, $La_7O_6(BO_3)(PO_4)_2$, $Pr_7O_6[BO_3][PO_4]_2$, $Nd_7O_6[BO_3][PO_4]_2$, $Sm_7O_6[BO_3][PO_4]_2$, $Gd_7O_6[BO_3][PO_4]_2$, $Dy_7O_6[BO_3][PO_4]_2$, $Mn_3(OH)_2[B(OH)_4][PO_4]$, and mixtures thereof, particularly preferably selected from the group consisting of $Zn_3[BO_3][PO_4]$, $Mg_3[BO_3][PO_4]$, $Co_3[BO_3][PO_4]$, $Mn_3(OH)_2[B(OH)_4][PO_4]$, and mixtures thereof.

Borate phosphates that can be used in the invention can be produced by any of the processes known to the person skilled in the art, for example those disclosed in the article *Structural Chemistry of Borophosphates and Related Compounds*, B. Ewald, Y.-X. Huang and R. Kniep, Z. Anorg. Chem. 2007, 633, 1517-1540, and in particular in the references cited therein.

It is particularly preferable that the mixture of the invention comprises, as compound A, metalloborophosphates which comprise a metal selected from the group of Be, Zn, Co, and mixtures thereof, in the anionic moiety.

In one preferred embodiment of the mixture of the invention, the at least one compound A is a metalloborophosphate selected from the group consisting of $NH_4[ZnBP_2O_8]$, $Rb[ZnBP_2O_8]$, $Cs[ZnBP_2O_8]$, $NH_4[(Zn_{1-x}Co_x)BP_2O_8]$ (x=0, 0.1, 0.2, 0.3, 0.4, 0.5, 0.6, 0.7, 0.8, 0.9, 1.0, in particular x=0, 1.0, 0.4, 0.5, 0.6) $Na[ZnBP_2O_8]·H_2O$, $(C_4N_3H_{16})[Zn_3B_3P_6O_{24}]·H_2O$, $(C_6N_4H_{22})_{1.5}[Zn_6B_6P_{12}O_{48}]·1.5H_2O$, $NH_4[ZnBP_2O_8]$, $K[ZnBP_2O_8]$, $Na[BeBP_2O_8]·xH_2O$ (x=0-1, in particular 0, 0.1, 0.2, 0.3, 0.4, 0.5, 0.6, 0.7, 0.8, 0.9, 1.0) $K[BeBP_2O_8]·xH_2O$ (x=0-1, in particular 0, 0.1, 0.2, 0.3, 0.4, 0.5, 0.6, 0.7, 0.8, 0.9, 1.0), $NH_4[BeBP_2O_8]·xH_2O$ (x=0-1, in particular 0, 0.1, 0.2, 0.3, 0.4, 0.5, 0.6, 0.7, 0.8, 0.9, 1.0), $[MBP_2O_8]$ (M=B, Al, Ga), and mixtures thereof.

The amount of the at least one compound A in the mixture of the invention is generally from 0.1 to 50.0% by weight, preferably from 1.0 to 30.0% by weight, particularly preferably from 2.0 to 15.0% by weight, based in each case on the entire mixture.

The amount of the at least one plastic K in the mixture of the invention is generally from 50.0 to 99.9% by weight, preferably from 70.0 to 99.0% by weight, particularly preferably from 85.0 to 98.0% by weight, based in each case on the entire mixture.

The total of the amounts of the at least one compound A and of the at least one plastic K, and also, if appropriate, of further additives present, is always 100% by weight.

The at least one compound A present in the mixture of the invention allows the total amount of flame-retardant additives to be lowered markedly, for example in comparison with the prior art combination of $Al(OH)_3$ and a P source.

Compounds A which are useable according to the present application show in general particularly high thermic stabilities. For example, compound $K_3[BP_3O_9(OH)_3]$ shows a thermic stability of up to 340° C., compound $(C_2H_{10}N_2)[BPO_4F_2]$ has a thermic stability of up to 310° C., amine comprising borophosphates show thermic stabilities of for example up to 470 or 500° C., see for example preparation and characterisation of templated borophosphates and metalloborophosphates, Ya-Xi Huang, Dissertation, TU Dresden, 2004 or borophosphates of main- and transition-groups, synthesis, characterisation and structure chemical classification, Bastian Ewald, Dissertation TU Dresden, 2006. These temperatures of decomposition allow their use in high melting thermoplastics, for example PA, PBT. Release of volatile, flame choking or cooling components with decomposition is obtained, as desired not until fire and not during processing of the plastic.

The present invention also relates to the mixture according to the present invention, wherein in addition, at least one flame retardant is present, selected from the group consisting of phosphorous containing compounds, nitrogen containing compounds, metal hydroxides, metal oxides, boron comprising compounds, silicates, silicon dioxide, sulfates, carbonates and mixtures thereof.

In a preferred embodiment of the present process the at least one phosphorus comprising compound is selected from the group consisting of metallphosphin salts of general formula (VI), their polymers of general formula (VII)

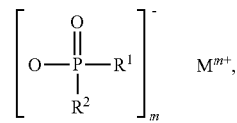

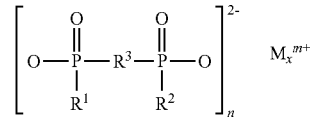

and mixtures thereof, wherein $R^1$, $R^2$, $R^3$, M, m, n and x have independently of each other the following meanings:

$R^1$, $R^2$ independently of each other hydrogen, linear or branched $C_1$-$C_{20}$-alkyl radical, substituted or unsubstituted $C_5$-$C_{22}$-aromatic radical, $R^3$ independent of each other linear or branched $C_1$-$C_{10}$-alkyl radical, substituted or unsubstituted $C_5$-$C_{22}$-aryl radical, -alkyl radical or -aryl alkyl radical, M independently of each other alkaline earth metal like Be, Mg, Ca, Ba, Sr, alkaline metal like Li, Na, K, Rb, Cs or Al, Zn, Ti, Zr, Si, Sn or nitrogen comprising compounds like melamine, piperazine, primary alkyl amines, secondary alkyl amines, tertiary alkyl amines, melam, melem, m independently of each other 1 to 4, for example 1, 2, 3, 4, n independently of each other 1 to 3, for example 1, 2, 3, x independently of each other 1 or 2.

The mentioned phosphorous comprising compounds are present in the mixture according to the present application in an amount of 0.1 to 50% by weight, in respect of the complete mixture.

In a further preferred embodiment of the process according to the present application the at least one nitrogen comprising compound is selected from the group consisting of melamine cyanurate, melamine borate, melamine phosphate, melamine polyphosphate, melamine pyrophosphate, melamine ammonium polyphosphate, melamine ammonium pyrophosphate and mixtures thereof.

The mentioned nitrogen comprising compounds are present in the mixture according to the present application in an amount of 0.1 to 50% by weight, in respect of the complete mixture.

Suitable metal hydroxides are selected from the group consisting of magnesium hydroxide, aluminum trihydroxide and mixtures thereof.

Suitable metal oxides are selected from the group consisting of zinc oxide, molybdenum trioxide, antimony oxide, aluminum oxide hydroxide and mixtures thereof.

A suitable boron comprising compound is zinc borate.

Suitable silicates are selected from the group consisting of calcium silicate, magnesium silicate and mixtures thereof.

A suitable sulfate is calcium sulfate.

A suitable carbonate is magnesium carbonate.

The mentioned metal hydroxides, metal oxides, boron comprising compounds, silicates, silicondioxide, sulfates, carbonates and mixtures thereof are present in the mixture according to the present application preferably in an amount of 0.1 to 10% by weight, in respect of the complete mixture.

Therefore, the present invention relates particularly to the mixture according to the present application, wherein the at least one additional flame retardant is selected from the group consisting of triphenyl phosphine oxide, aluminum triethylphospinate, zinc diethylphosphonate, melamine cyanurate, melamine phosphate, melamine polyphosphate, melamine pyrophosphate, melaminammoniumpolyphosphate, melaminammoniumpyrophosphate, melaminborate, triphenylphosphate, resorcinol-bis-(diphenylphosphate), bis-phenol-A-bis-diphenylphosphate, resorcinol-bis-(2,6-dixylylene phosphate), aluminum hydroxide, aluminum oxide hydroxide, magnesium dihydroxide, zinc oxide, molybdenum trioxide, antimony oxide, aluminum trihydroxide, zinc borate, calcium silicate, magnesium silicate, calcium sulfate, magnesium carbonate, dihydroxaphosphaphenanthrene, dihydroxaphosphaphenanthrene-hydrorchinone, potassium-diphenyl-sulfonsulfonate, polymethylphenylsiloxane, potassium-butylperfluorosulfonate and mixtures thereof.

The mixture according to the present application can, in a further embodiment of the present invention, comprise an antidripping agent, for example polytetraflurethylene (PTFE).

The present invention therefore also relates to the mixture according to the present invention, wherein an antidripping agent, preferably polytetrafluorethylene (PTFE) is present.

The antidripping agent, for example polytetrafluoroethylene (PTFE), is preferably present in the mixture according to the present invention in an amount of 0 to 5% by weight, particularly preferably 0.1 to 5% by weight, in respect of the complete mixture in each case.

The present invention therefore also relates to the use of a compound selected from the group consisting of borophosphates, borate phosphates, metalloborophosphates, and mixtures thereof, as flame retardant in plastics. In respect of the compounds, the plastics, the amounts, the further details, and the preferred embodiments, the information given in respect of the mixture of the invention is applicable.

The present invention preferably relates to the use according to the present invention, wherein additionally at least one flame retardant is present, selected from the group consisting of phosphorous comprising compounds, nitrogen comprising compounds, metal hydroxides, metal oxides, boron comprising compounds, silicates, silicon dioxide, sulfates, carbonates and mixtures thereof.

In respect of these compounds, the preferred embodiments and the amounts, the above in respect of the mixture according to the present invention mentioned applies.

In a preferred embodiment, the present invention relates to the use according to the present invention, wherein the at least one additional flame retardant is selected from the group consisting of triphenyl phosphine oxide, aluminum triethylphosphinate, zinc diethyl phosphinate, melamine cyanurate, melamine phosphate, melamine polyphosphate, melamine pyrophosphate, melamine ammonium polyphosphate, melamine ammonium pyrophosphate, melamine borate, triphenyl phosphate, resorcinol-bis-(diphenylphosphate), bis-phenol-A-bis-(diphenylphosphate), resorcinol-(bis-2,6-dixylylene phosphate), aluminum hydroxide, aluminum oxide hydroxide, magnesium dihydroxide, zinc oxide, molybdenum trioxide, antimony oxide, aluminum trioxide, zinc borate, calcium silicate, magnesium silicate, calcium sulfate, magnesium carbonate, dihydroxaphosphaphenanthrene, dihydroxaphosphaphenanthrene-hydrochinone, potassium-diphenylsulfon sulfonate, polymethylphenylsiloxane, potassium-butylperfluorosulfonate and mixtures thereof.

Alongside the at least one plastic K and the at least one compound A, there can be further, conventional additives present in the mixture of the invention, examples being colorants, impact modifiers, heat stabilizers and light stabilizers, lubricants and mold-release agents, for example polyethyene wax, in conventional amounts, reinforcing agents, such as glass fibers, asbestos fibers, carbon fibers, aromatic polyamide fibers, and/or fillers, gypsum fibers, synthetic calcium silicates, kaolin, calcined kaolin, wollastonite, talc, and chalk, and/or low-molecular-weight polymers.

A colorant is generally any of the colorant substances to DIN 55944, and these can be divided into inorganic and organic colorants, and also natural and synthetic colorants (see Römpp's Chemical Encyclopedia, 1981, 8$^{th}$ edition, p. 1237). Examples of colorants suitable in the invention are those selected from the group of the pigments having black, white, red, green, yellow, or blue color, and are preferably used in powder form. The person skilled in the art is aware of colorants, in particular color pigments, that can be used in plastics mixtures. Examples of the amounts of the colorant comprised in the mixture of the invention are from 0.001 to 60% by weight, preferably from 0.01 to 30% by weight, in particular from 0.1 to 10% by weight, and very particularly from 0.2 to 5% by weight, based in each case on the entire mixture.

The person skilled in the art is aware of suitable impact modifiers, the amounts of these comprised in the mixture of the invention being by way of example up to 20% by weight, preferably up to 15% by weight, based in each case on the entire mixture. Suitable materials are conventional rubbers, e.g. ethylene copolymers having reactive groups, acrylate rubber, and polymers of conjugated dienes, e.g. polybutadiene rubber and polyisoprene rubber. The diene polymers can have been hydrogenated completely or to some extent, in a manner known per se. Examples of other materials that can be used are: acrylonitrile-butadiene rubber, hydrogenated styrene-butadiene rubber, ethylene-propylene-diene rubber, polybutylene rubbers and polyoctenamer rubbers, ionomers, block copolymers of vinylaromatic monomers with dienes, such as butadiene or isoprene (known per se from EP-A 62 282) having M1M2 structure, M1M2M1M2 structure, or M1M2M1 structure, where these block polymers can also comprise segments having random distribution, and also star block copolymers. Materials that have proven particularly suitable are polymers of conjugated dienes, e.g. polybutadiene rubber or polyisoprene rubber. The person skilled in the art is familiar with synthetic rubbers of this type, and a summary of these is given in "Ullmanns Encyklopädie der Technischen Chemie" [Ullmann's encyclopedia of industrial chemistry], 4$^{th}$ edition, vol. 13, pages 595 to 634, Verlag Chemie GmbH, Weinheim 1977.

The present invention also provides a process for the production of the mixture of the invention, via mixing of the at least one plastic K with at least one compound A and, if appropriate, with further additives, to the extent that these are present in the mixture of the invention.

Any of the processes known to the person skilled can be used for the mixing process, examples being processes in intensive mixers or using coextrusion of the components.

Suitable mixing apparatuses are: intensive mixers, e.g. as described in "Wolfgang Pietsch: Agglomeration Processes—Phenomena, Technologies, Equipment, Wiley-VCH, Weinheim 2002, chapter 7.4.2: High Shear Mixers, pages 171-187".

Suitable peripheral velocities of the mixing tools are from 0.5 m/s to 15 m/s, preferably from 1 m/s to 10 m/s.

The residence time in the mixer is usually from 1 to 60 minutes, preferably from 2 to 30 minutes.

The temperature in the mixer is generally from 10 to 120° C., preferably from 20 to 100° C.

The pressure is usually from 0.5 to 1.1 bar, preferably from 0.9 to 1.1 bar.

The person skilled in the art is aware of coextrusion processes for the production of the mixture of the invention, and these are described by way of example in DE 10 2005 032 700. The mixing process for the production of the mixture of the invention can also use injection molding.

The examples below provide further explanation of the present invention:

EXAMPLES

1. Borophosphates, Borate-Phosphates and Metalloborophosphates in Nylon-6,6

The examples below derive from a flame-retardant PA66 which comprises Exolit OP1312® flame retardant (mixture of alkylphosphinates+melamine polyphosphate+Zn borate) from Clariant, alongside glass fibers and Al stearate, and also Irganox 1098® antioxidant from Ciba.

Each of the flame-retardant compositions in inventive examples 1.1a-f, 1.2a-f and 1.3a-f contains a compound BPO from the group of $Zn[BPO_4(OH)_2]$, $Ca[BPO_5]$, $Na_2[B_7P_3O_{19}] \cdot H_2O$ (WO9525066), $Mg_3BPO_7$, $Zn_3BPO_7$, $Al[B_2P_2O_7(OH)_5]$.

Comparative Example 1

| % by wt. | Component |
|---|---|
| 54.45 | Nylon-6,6 |
| 25 | Glass fibers |
| 20 | Exolit OP1312 (Clariant) |
| 0.35 | Irganox 1098 (Ciba) |
| 0.2 | Al stearate |

Inventive Examples 1.1a-f

| | Inventive example | | | | | |
|---|---|---|---|---|---|---|
| Component | 1.1a % by wt. | 1.1b % by wt. | 1.1c % by wt. | 1.1d % by wt. | 1.1e % by wt. | 1.1f % by wt. |
| Nylon-6,6 | 54.45 | 54.45 | 54.45 | 54.45 | 54.45 | 54.45 |
| Glass fibers | 25 | 25 | 25 | 25 | 25 | 25 |
| Exolit OP1312 (Clariant) | 10 | 10 | 10 | 10 | 10 | 10 |
| Irganox 1098 (Ciba) | 0.35 | 0.35 | 0.35 | 0.35 | 0.35 | 0.35 |
| Al stearate | 0.2 | 0.2 | 0.2 | 0.2 | 0.2 | 0.2 |
| $Zn[BPO_4(OH)_2]$ | 10 | — | — | — | — | — |
| $Ca[BPO_5]$ | — | 10 | — | — | — | — |
| $Na_2[B_7P_3O_{19}] \cdot H_2O$ | — | — | 10 | — | — | — |
| $Mg_3BPO_7$ | — | — | — | 10 | — | — |
| $Zn_3BPO_7$ | — | — | — | — | 10 | — |
| $Al[B_2P_2O_7(OH)_5]$ | — | — | — | — | — | 10 |

Inventive Examples 1.2a-f

| | Inventive example | | | | | |
|---|---|---|---|---|---|---|
| Component | 1.2a % by wt. | 1.2b % by wt. | 1.2c % by wt. | 1.2d % by wt. | 1.2e % by wt. | 1.2f % by wt. |
| Nylon-6,6 | 54.45 | 54.45 | 54.45 | 54.45 | 54.45 | 54.45 |
| Glass fibers | 25 | 25 | 25 | 25 | 25 | 25 |
| Exolit OP1312 (Clariant) | — | — | — | — | — | — |
| Irganox 1098 (Ciba) | 0.35 | 0.35 | 0.35 | 0.35 | 0.35 | 0.35 |
| Al stearate | 0.2 | 0.2 | 0.2 | 0.2 | 0.2 | 0.2 |
| $Zn[BPO_4(OH)_2]$ | 20 | — | — | — | — | — |
| $Ca[BPO_5]$ | — | 20 | — | — | — | — |
| $Na_2[B_7P_3O_{19}] \cdot H_2O$ | — | — | 20 | — | — | — |
| $Mg_3BPO_7$ | — | — | — | 20 | — | — |
| $Zn_3BPO_7$ | — | — | — | — | 20 | — |
| $Al[B_2P_2O_7(OH)_5]$ | — | — | — | — | — | 20 |

Inventive Examples 1.3a-f

| | Inventive example | | | | | |
|---|---|---|---|---|---|---|
| Component | 1.3a % by wt. | 1.3b % by wt. | 1.3c % by wt. | 1.3d % by wt. | 1.3e % by wt. | 1.3f % by wt. |
| Nylon-6,6 | 54.45 | 54.45 | 54.45 | 54.45 | 54.45 | 54.45 |
| Glass fibers | 25 | 25 | 25 | 25 | 25 | 25 |
| Exolit OP1312 (Clariant) | — | — | — | — | — | — |
| Irganox 1098 (Ciba) | 0.35 | 0.35 | 0.35 | 0.35 | 0.35 | 0.35 |
| Al stearate | 0.2 | 0.2 | 0.2 | 0.2 | 0.2 | 0.2 |
| $Zn[BPO_4(OH)_2]$ | 10 | — | — | — | — | — |
| $Ca[BPO_5]$ | — | 10 | — | — | — | — |
| $Na_2[B_7P_3O_{19}] \cdot H_2O$ | — | — | 10 | — | — | — |
| $Mg_3BPO_7$ | — | — | — | 10 | — | — |
| $Zn_3BPO_7$ | — | — | — | — | 10 | — |
| $Al[B_2P_2O_7(OH)_5]$ | — | — | — | — | — | 10 |

The examples below are derived from a flame-retardant PA66 which comprises red phosphorus (Italmatch S.r.l. or Exolit RP601B©) alongside glass fibers and Ca stearate, as flame retardant. Each of the flame-retardant compositions in inventive examples 2.1a-f and 2.2a-f contains a compound from the group of $Zn[BPO_4(OH)_2]$, $Ca[BPO_5]$, $Na_2[B_7P_3O_{19}]\cdot H_2O$ (WO9525066), $Mg_3BPO_7$, $Zn_3BPO_7$, $Al[B_2P_2O_7(OH)_5]$.

Comparative Example 2

| % by wt. | Component |
|---|---|
| 62.51 | Nylon-6,6 |
| 25 | Glass fibers |
| 7.0 | Exolit RP601B © |
| 5 | Lupolen |
| 0.14 | CuI/KI 1:4 |
| 0.35 | Ca stearate |

Inventive examples 2.1a-f

| | Inventive example | | | | | |
|---|---|---|---|---|---|---|
| Component | 2.1a % by wt. | 2.1b % by wt. | 2.1c % by wt. | 2.1d % by wt. | 2.1e % by wt. | 2.1f % by wt. |
| Nylon-6,6 | 62.51 | 62.51 | 62.51 | 62.51 | 62.51 | 62.51 |
| Glass fibers | 25 | 25 | 25 | 25 | 25 | 25 |
| Exolit RP601B © | 3.5 | 3.5 | 3.5 | 3.5 | 3.5 | 3.5 |
| Lupolen | 5 | 5 | 5 | 5 | 5 | 5 |
| CuI/KI 1:4 | 0.14 | 0.14 | 0.14 | 0.14 | 0.14 | 0.14 |
| Ca stearate | 0.35 | 0.35 | 0.35 | 0.35 | 0.35 | 0.35 |
| $Zn[BPO_4(OH)_2]$ | 3.5 | — | — | — | — | — |
| $Ca[BPO_5]$ | — | 3.5 | — | — | — | — |
| $Na_2[B_7P_3O_{19}]\cdot H_2O$ | — | — | 3.5 | — | — | — |
| $Mg_3BPO_7$ | — | — | — | 3.5 | — | — |
| $Zn_3BPO_7$ | — | — | — | — | 3.5 | — |
| $Al[B_2P_2O_7(OH)_5]$ | — | — | — | — | — | 3.5 |

Inventive Examples 2.2a-f

| | Inventive example | | | | | |
|---|---|---|---|---|---|---|
| Component | 2.2a % by wt. | 2.2b % by wt. | 2.2c % by wt. | 2.2d % by wt. | 2.2e % by wt. | 2.2f % by wt. |
| Nylon-6,6 | 62.51 | 62.51 | 62.51 | 62.51 | 62.51 | 62.51 |
| Glass fibers | 25 | 25 | 25 | 25 | 25 | 25 |
| Exolit RP601B © | — | — | — | — | — | — |
| Lupolen | 5 | 5 | 5 | 5 | 5 | 5 |
| CuI/KI 1:4 | 0.14 | 0.14 | 0.14 | 0.14 | 0.14 | 0.14 |
| Ca stearate | 0.35 | 0.35 | 0.35 | 0.35 | 0.35 | 0.35 |
| $Zn[BPO_4(OH)_2]$ | 7.0 | — | — | — | — | — |
| $Ca[BPO_5]$ | — | 7.0 | — | — | — | — |
| $Na_2[B_7P_3O_{19}]\cdot H_2O$ | — | — | 7.0 | — | — | — |
| $Mg_3BPO_7$ | — | — | — | 7.0 | — | — |
| $Zn_3BPO_7$ | — | — | — | — | 7.0 | — |
| $Al[B_2P_2O_7(OH)_5]$ | — | — | — | — | — | 7.0 |

2. Borophosphates, Borate-Phosphates and Metalloborophosphates in Polybutylene Terephthalate (PBT)

The examples below derive from a flame-retardant PBT (comparative example 3) which comprises Exolit OP1200® flame retardant (2:1 mixture made of aluminum diethylphosphinate and melamine cyanurate) from Clariant, alongside glass fibers. Each of inventive examples 3.1a-f, 3.2a-f and 3.3a-f contains a compound from the group of $Zn[BPO_4(OH)_2]$, $Ca[BPO_5]$, $Na_2[B_7P_3O_{19}]\cdot H_2O$ (WO9525066), $Mg_3BPO_7$, $Zn_3BPO_7$, $Al[B_2P_2O_7(OH)_5]$ Comparative Example 3

| % by wt. | Component |
|---|---|
| 55 | Polybutylene terephthalate |
| 20 | Exolit OP1200 ® |
| 25 | Glass fibers |

Inventive Examples 3.1a-f

| | Inventive example | | | | | |
|---|---|---|---|---|---|---|
| Component | 3.1a % by wt. | 3.1b % by wt. | 3.1c % by wt. | 3.1d % by wt. | 3.1e % by wt. | 3.1f % by wt. |
| Polybutylene terephthalate | 55 | 55 | 55 | 55 | 55 | 55 |
| Exolit OP1200 ® | 10 | 10 | 10 | 10 | 10 | 10 |
| Glass fibers | 25 | 25 | 25 | 25 | 25 | 25 |
| $Zn[BPO_4(OH)_2]$ | 10 | — | — | — | — | — |
| $Ca[BPO_5]$ | — | 10 | — | — | — | — |
| $Na_2[B_7P_3O_{19}]\cdot H_2O$ | — | — | 10 | — | — | — |
| $Mg_3BPO_7$ | — | — | — | 10 | — | — |
| $Zn_3BPO_7$ | — | — | — | — | 10 | — |
| $Al[B_2P_2O_7(OH)_5]$ | — | — | — | — | — | 10 |

Inventive Examples 3.2a-f

| | Inventive example | | | | | |
|---|---|---|---|---|---|---|
| Component | 3.2a % by wt. | 3.2b % by wt. | 3.2c % by wt. | 3.2d % by wt. | 3.2e % by wt. | 3.2f % by wt. |
| Polybutylene terephthalate | 55 | 55 | 55 | 55 | 55 | 55 |
| Exolit OP1200 ® | — | — | — | — | — | — |
| Glass fibers | 25 | 25 | 25 | 25 | 25 | 25 |
| $Zn[BPO_4(OH)_2]$ | 20 | — | — | — | — | — |
| $Ca[BPO_5]$ | — | 20 | — | — | — | — |
| $Na_2[B_7P_3O_{19}]\cdot H_2O$ | — | — | 20 | — | — | — |
| $Mg_3BPO_7$ | — | — | — | 20 | — | — |
| $Zn_3BPO_7$ | — | — | — | — | 20 | — |
| $Al[B_2P_2O_7(OH)_5]$ | — | — | — | — | — | 20 |

Inventive Examples 3.3a-f

| Component | 3.3a % by wt. | 3.3b % by wt. | 3.3c % by wt. | 3.3d % by wt. | 3.3e % by wt. | 3.3f % by wt. |
|---|---|---|---|---|---|---|
| Polybutylene terephthalate Exolit OP1200 ® | 61.875 | 61.875 | 61.875 | 61.875 | 61.875 | 61.875 |
| Glass fibers | 28.125 | 28.125 | 28.125 | 28.125 | 28.125 | 28.125 |
| Zn[BPO$_4$(OH)$_2$] | 10 | — | — | — | — | — |
| Ca[BPO$_5$] | — | 10 | — | — | — | — |
| Na$_2$[B$_7$P$_3$O$_{19}$]•H$_2$O | — | — | 10 | — | — | — |
| Mg$_3$BPO$_7$ | — | — | — | 10 | — | — |
| Zn$_3$BPO$_7$ | — | — | — | — | 10 | — |
| Al[B$_2$P$_2$O$_7$(OH)$_5$] | — | — | — | — | — | 10 |

3. Borophosphates, Borate-Phosphates and Metalloborophosphates in Polyacrylonitrile-Butadiene-Styrene) (ABS)

The polymer (component A, a-I) used comprises a commercially available acrylonitrile-butadiene-styrene copolymer (ABS), Terluran® from BASF SE, comprising a styrene-acrylonitrile copolymer hard phase and a particulate butadiene graft rubber.

The following examples derive from a flame-retardant ABS (comparative example 4) which comprises Disflamol® TP, a triphenyl phosphate from Lanxess Aktiengesellschaft, besides expandable graphite and polytetrafluoroethylene. Each of inventive examples 4.1a-f and 4.2a-f comprises a BPO compound from the group of Zn[BPO$_4$(OH)$_2$], Ca[BPO$_5$], Na$_2$[B$_7$P$_3$O$_{19}$].H$_2$O (WO9525066), Mg$_3$BPO$_7$, Zn$_3$BPO$_7$, Al[B$_2$P$_2$O$_7$(OH)$_5$] from the group Fe[BP$_2$O$_7$(OH)$_5$], Zn[BPO$_4$(OH)$_2$], Ca[BPO$_5$], Na$_2$[B$_7$P$_3$O$_{19}$]. H$_2$O (WO9525066), Mg$_3$BPO$_7$, Zn$_3$BPO$_7$, Fe[B$_2$P$_2$O$_7$(OH)$_5$].

The flame retardant (component B, b-I) used comprises Nord-Min® 503 expandable graphite from Nordmann, Rassmann, GmbH, with average particle size D50 of 465 μm, free expansion (beginning at about 300° C.) of at least 150 ml/g, and bulk density of 0.5 g/ml at 20° C.

The component B2) used comprises:
b2-I: Disflamol® TP, a triphenyl phosphate from Lanxess Aktiengesellschaft.

The component B3) used comprises:
b3-I: Polytetrafluoroethylene PTFE TE-3893, Teflon® Dispersion from C. H. Erbslöh with PTFE content of 60% by weight (based on the total weight of the dispersion)

The further BPO component used comprises a compound from the group of Zn[BPO$_4$(OH)$_2$], Ca[BPO$_5$], Na$_2$[B$_7$P$_3$O$_{19}$].H$_2$O (WO9525066), Mg$_3$BPO$_7$, Zn$_3$BPO$_7$, Fe[B$_2$P$_2$O$_7$(OH)$_5$].

Inventive Examples 4.1a-f

| Component | 4.1a % by wt. | 4.1b % by wt. | 4.1c % by wt. | 4.1d % by wt. | 4.1e % by wt. | 4.1f % by wt. |
|---|---|---|---|---|---|---|
| a-I | 77.6 | 77.6 | 77.6 | 77.6 | 77.6 | 77.6 |
| b1-I | 12 | 12 | 12 | 12 | 12 | 12 |
| b2-I | — | — | — | — | — | — |
| b3-I | 0.4 | 0.4 | 0.4 | 0.4 | 0.4 | 0.4 |
| Zn[BPO$_4$(OH)$_2$] | 10 | — | — | — | — | — |
| Ca[BPO$_5$] | — | 10 | — | — | — | — |
| Na$_2$[B$_7$P$_3$O$_{19}$]•H$_2$O | — | — | 10 | — | — | — |
| Mg$_3$BPO$_7$ | — | — | — | 10 | — | — |
| Zn$_3$BPO$_7$ | — | — | — | — | 10 | — |
| Fe[B$_2$P$_2$O$_7$(OH)$_5$] | — | — | — | — | — | 10 |

Inventive Examples 4.2a-f

| Component | 4.2a % by wt. | 4.2b % by wt. | 4.2c % by wt. | 4.2d % by wt. | 4.2e % by wt. | 4.2f % by wt. |
|---|---|---|---|---|---|---|
| a-I | 81.6 | 81.6 | 81.6 | 81.6 | 81.6 | 81.6 |
| b1-I | 12 | 12 | 12 | 12 | 12 | 12 |
| b2-I | — | — | — | — | — | — |
| b3-I | 0.4 | 0.4 | 0.4 | 0.4 | 0.4 | 0.4 |
| Zn[BPO$_4$(OH)$_2$] | 6 | — | — | — | — | — |
| Ca[BPO$_5$] | — | 6 | — | — | — | — |
| Na$_2$[B$_7$P$_3$O$_{19}$]•H$_2$O | — | — | 6 | — | — | — |
| Mg$_3$BPO$_7$ | — | — | — | 6 | — | — |
| Zn$_3$BPO$_7$ | — | — | — | — | 6 | — |
| Fe[B$_2$P$_2$O$_7$(OH)$_5$] | — | — | — | — | — | 6 |

To determine the fire properties specified in table 1, components A) to D) (see table 1 for respective parts by weight) are homogenized in a DSM Midiextruder and extruded using an attached injection-molding system at a melt temperature of 240° C. and a mold-surface temperature of 80° C. to give UL 94 vertical burning standard test specimens of thickness 1.6 mm.

TABLE 1

Comparison of fire properties using BPO = Fe[BP$_2$O$_7$(OH)$_5$]

| | Example | | |
|---|---|---|---|
| Constitution | Comparative Example 4 [% by wt.] | Inventive Example 4.1f [% by wt.] | Inventive Example 4.2f [% by wt.] |
| a-I | 77.6 | 77.6 | 81.6 |
| b1-I | 12 | 12 | 12 |
| b2-I | 10 | — | — |
| BPO | — | 10 | 6 |
| b3-I | 0.4 | 0.4 | 0.4 |
| Afterflame time t$_1$ [s] | 8.7 | 2.1 | 1.9 |
| Afterflame time t$_2$ [s] | >50 | 6.4 | 11.4 |
| Afterflame time t$_3$ [s] | >50 | 8.5 | 13.3 |

Afterflame Time t$_N$ [s]:

In the fire test based on UL 94 vertical burning standard, the first afterflame time t1 is measured on specimens of thickness 1.6 mm after a first flame-application period of 10 seconds. Beginning 2 seconds after extinguishment of the flames, the second flame-application period is again 10 seconds, and after this the second afterflame time t2 is measured. The sum of afterflame times t1 and t2 gives the afterflame time t$_N$ (the value stated in each case being the average of afterflame times determined on two specimens).

4. Borophosphates in Polyamide (PA) or Polybutylene Terephthalate (PBT)

Flammability Test Method for PA Formulations and PBT Formulations

The borophosphates (BPO) Mg$_3$[BO$_3$][PO$_4$] (MgBPO) and Zn$_3$[BO$_3$][PO$_4$] (ZnBPO) are tested as flame retardants in both PA66 systems and PBT systems.

Table 2 shows the appropriate polymers and the constitutions of the other flame retardant additives comprised in the systems.

TABLE 2

Polymers and flame-retardant additives used in the tests

| Compound | Constitution | Application |
|---|---|---|
| Exolit OP 1200 | 2:1 mixture of aluminum diethylphosphinate and melamine cyanurate | Flame retardant for PBT |
| Exolit OP 1312 | 2:1 mixture of aluminum diethylphosphinate and melamine cyanurate, with 5% of zinc borate added | Flame retardant for PA66 |
| Exolit OP 1240 | Aluminum diethylphosphinate | Flame retardant |
| Melapur P200 | Melamine polyphosphate | Synergist |
| B4300 G6 | PBT with 30% of glass fibers | Polymer matrix |
| A3WG5 | PA66 with 25% of glass fibers | Polymer matrix |

The BPO compounds of the invention are used to replace up to 25% by weight of the amount of Exolit, and are also used as sole synergist for Exolit OP 1240, or in combination with a second synergist. The materials are mixed in a 17 mL Miniextruder and then test bars of thickness 0.8 mm are produced by injection molding. Table 3 collates the processing conditions.

TABLE 3

Mixing parameters for PA66 and PBT.

| | Extrusion temp. [° C.] | Extrusion time [min] | Screw speed [rpm] | Injection-molding temp. [° C.] | Melting point [° C.] |
|---|---|---|---|---|---|
| PA66 | 285 | 3 | 80 | 290 | 160 |
| PBT | 260 | 3 | 80 | 260 | 160 |

A vertical UL 94 test is used to determine the flame-retardant effect of the compositions. Specimens in the form of strips with various thicknesses are ignited and evaluated for their fire performance. V-0 at 0.8 mm indicates a short burning time without any drops, and is taken as reference level for the purposes of this study. V-1 indicates a burning time of more than 10 s, and V-2 indicates burning polymer drops. Matrices of PA or of PBT without flame-retardant additives are completely consumed by burning, and are given V-classification.

Results and Evaluation

The two compounds used, MgBPO and ZnBPO, exhibit good matrix compatibility with PA66 and PBT.

Tables 4 and 5 show the compositions comprising PA or PBT, and the corresponding UL 94 test results. All of the quantitative data are in % by weight.

TABLE 4

PBT formulations and flame test results.

| | 1 | 2 | 3 | 4 | 5 | 6 | 7 | 8 | 9 |
|---|---|---|---|---|---|---|---|---|---|
| B4300 G6 | 77.5 | 77.5 | 77.5 | 77.5 | 77.5 | 77.5 | 77.5 | 77.5 | 77.5 |
| Exolit OP 1200 | 22.5 | 20 | 15 | — | — | 20 | 15 | — | — |
| Exolit OP 1240 | — | — | — | 15 | 10 | — | — | 15 | 10 |
| MgBPO | — | 2.5 | 7.5 | 7.5 | 7.5 | — | — | — | — |
| ZnBPO | — | — | — | — | — | 2.5 | 7.5 | 7.5 | 7.5 |
| Melapur P200 | — | — | — | — | 5 | — | — | — | 5 |
| UL 94 rating | V-0 | V-0 | V-1 | V-1 | V-0 | V-1 | V-1 | V-1 | V-0 |

TABLE 5

PBT formulations and flame test results.

| | 1 | 2 | 3 | 4 | 5 | 6 | 7 |
|---|---|---|---|---|---|---|---|
| A3WG5 | 80 | 80 | 80 | 80 | 80 | 80 | 80 |
| Exolit OP 1312 | 20 | 17.5 | 15 | — | 17.5 | 15 | — |
| Exolit OP 1240 | — | — | — | 13.4 | — | — | 13.4 |
| MgBPO | — | 2.5 | 5 | 6.7 | — | — | — |
| ZnBPO | — | — | — | — | 2.5 | 5 | 6.7 |
| UL 94 rating | V-0 | V-0 | V-0 | V-1 | V-0 | V-0 | V-1 |

The invention claimed is:

1. A mixture comprising at least one plastic K and from 0.1 to 30% by weight, based on the entire mixture, and at least one compound A which is a metalloborophosphate selected from the group consisting of $NH_4[ZnBP_2O_8]$, $Rb[ZnBP_2O_8]$, $Cs[ZnBP_2O_8]$, $NH_4[(Zn_{1-x}Co_x)BP_2O_8]$ (x=0, 0.1, 0.2, 0.3, 0.4, 0.5, 0.6, 0.7, 0.8, 0.9, 1.0), $Na[ZnBP_2O_8]\cdot H_2O$, $(C_4N_3H_{16})[Zn_3B_3P_6O_{24}]\cdot H_2O$, $(C_6N_4H_{22})_{1.5}[Zn_6B_6P_{12}O_{48}]\cdot 1.5H_2O$, $NH_4[ZnBP_2O_8]$, $K[ZnBP_2O_8]$, $[MBP_2O_8]$ (M=B, Al, Ga), and mixtures thereof.

2. The mixture according to claim 1, wherein the at least one plastic K is selected from the group consisting of polyoxymethylene homo- or copolymers, polycarbonates, polyesters, polyolefins, poly(meth)acrylates, polyamides, vinylaromatic polymers, polyarylene ethers, epoxy resins and mixtures thereof.

3. The mixture according to claim 1 further comprising at least one additional flame retardant selected from the group consisting of phosphorous containing compounds, nitrogen containing compounds, metal hydroxides, metal oxides, boron comprising compounds, silicates, silicon dioxide, sulfates, carbonates and mixtures thereof.

4. The mixture according to claim 3, wherein the at least one additional flame retardant is selected from the group consisting of triphenyl phosphine oxide, aluminum triethylphospinate, zinc diethylphosphonate, melamine cyanurate, melamine phosphate, melamine polyphosphate, melamine pyrophosphate, melaminammoniumpolyphosphate, melaminammoniumpyrophosphate, melaminborate, triphenylphosphate, resorcinol-bis-(diphenylphosphate), bis-phenol-A-bis-diphenylphosphate, resorcinol-bis-(2,6-dixylylene phosphate), aluminum hydroxide, aluminum oxide hydroxide, magnesium dihydroxide, zinc oxide, molybdenum trioxide, antimony oxide, aluminum trihydroxide, zinc borate, calcium silicate, magnesium silicate, calcium sulfate, magnesium carbonate, dihydroxaphosphaphenanthrene, dihydroxaphosphaphenanthrene-hydorchinone, potassium-diphenyl-sulfonsulfonate, polymethylphenylsiloxane, potassium-butylperfluorosulfonate and mixtures thereof.

5. The mixture according to claim 1 further comprising an antidripping agent.

6. A process for the production of a mixture according to claim 1 which comprises mixing the at least one plastic K with at least one compound A.

7. The mixture according to claim 1, wherein said at least one component A is from 1 to 30% by weight, based on the entire mixture.

8. The mixture according to claim 1, wherein said at least one component A is from 2 to 15% by weight, based on the entire mixture.

9. The mixture according to claim 1, wherein at least one plastic K in the mixture is from 50 to 99% by weight based on the entire mixture.

10. The mixture according to claim 1, wherein at least one plastic K in the mixture is from 85 to 98% by weight based on the entire mixture.

* * * * *